United States Patent
Arndt et al.

(10) Patent No.: US 7,480,742 B2
(45) Date of Patent: *Jan. 20, 2009

(54) METHOD FOR VIRTUAL ADAPTER DESTRUCTION ON A PHYSICAL ADAPTER THAT SUPPORTS VIRTUAL ADAPTERS

(75) Inventors: Richard Louis Arndt, Austin, TX (US); Giora Biran, Zichron-Yaakov (IL); Harvey Gene Kiel, Rochester, MN (US); Vadim Makhervaks, Austin, TX (US); Renato John Recio, Austin, TX (US); Leah Shalev, Zichron-Yaakov (IL); Jaya Srikrishnan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 452 days.

This patent is subject to a terminal disclaimer.

(21) Appl. No.: 11/065,818

(22) Filed: Feb. 25, 2005

(65) Prior Publication Data
US 2006/0224790 A1    Oct. 5, 2006

(51) Int. Cl.
G06F 13/00    (2006.01)
G06F 3/00    (2006.01)
G06F 9/46    (2006.01)
G06F 12/00    (2006.01)
G06F 12/10    (2006.01)

(52) U.S. Cl. .................. 710/8; 710/62; 710/63; 710/64; 710/72; 710/104; 718/1; 718/104; 719/319; 719/324; 713/100; 711/1; 711/6; 711/202; 711/203; 711/206; 711/207; 711/208; 711/209

(58) Field of Classification Search .................. None
See application file for complete search history.

(56) References Cited

U.S. PATENT DOCUMENTS

| | | | |
|---|---|---|---|
| 5,659,786 A * | 8/1997 | George et al. ............ 713/100 |
| 6,111,894 A | 8/2000 | Bender et al. |
| 6,134,641 A | 10/2000 | Anand |
| 6,453,392 B1 | 9/2002 | Flynn, Jr. |
| 6,629,157 B1 | 9/2003 | Falardeau et al. |
| 6,629,162 B1 | 9/2003 | Arndt et al. |

(Continued)

FOREIGN PATENT DOCUMENTS

EP    1508855 A2    8/2004

OTHER PUBLICATIONS

U.S. Appl. No. 11/066,201, Arndt et al., System and Method for Modification of Virtual Adapter Resources in a Logically Partitioned Data Processing System, filed Feb. 25, 2005.

(Continued)

Primary Examiner—Tanh Q Nguyen
(74) Attorney, Agent, or Firm—Duke W. Yee; Diana L. Roberts-Gerhardt; Lisa L. B. Yociss

(57) ABSTRACT

A method for directly destroying the resources associated with one or more virtual adapters that reside within a physical adapter is provided. A mechanism is provided for directly destroying the resources associated with one or more virtual adapters that reside within a physical adapter, such as a PCI, PCI-X, or PCI-E adapter.

6 Claims, 12 Drawing Sheets

U.S. PATENT DOCUMENTS

| | | | |
|---|---|---|---|
| 6,662,289 | B1 | 12/2003 | Ang |
| 6,665,759 | B2 | 12/2003 | Dawkins et al. |
| 6,704,284 | B1 | 3/2004 | Stevenson et al. |
| 6,804,741 | B2 | 10/2004 | Cowan |
| 6,823,418 | B2 | 11/2004 | Langendorf et al. |
| 6,880,021 | B2 | 4/2005 | Easton et al. |
| 6,973,510 | B2 | 12/2005 | Arndt et al. |
| 7,007,183 | B2 * | 2/2006 | Rawson, III ................ 713/324 |
| 7,080,291 | B2 | 7/2006 | Moriki et al. |
| 7,283,473 | B2 * | 10/2007 | Arndt et al. ................ 370/231 |
| 2002/0069335 | A1 | 6/2002 | Flynn, Jr. |
| 2002/0085493 | A1 | 7/2002 | Pekkala et al. |
| 2002/0112102 | A1 | 8/2002 | Tarui et al. |
| 2002/0129172 | A1 | 9/2002 | Baskey et al. |
| 2002/0129212 | A1 | 9/2002 | Lee et al. |
| 2003/0014738 | A1 | 1/2003 | Dawkins et al. |
| 2003/0061379 | A1 | 3/2003 | Craddock et al. |
| 2003/0110205 | A1 | 6/2003 | Johnson |
| 2003/0120914 | A1 * | 6/2003 | Axnix et al. ................ 713/100 |
| 2003/0204648 | A1 | 10/2003 | Arndt |
| 2003/0212873 | A1 * | 11/2003 | Lee et al. ................ 711/170 |
| 2003/0236852 | A1 | 12/2003 | Fernandes et al. |
| 2004/0187106 | A1 * | 9/2004 | Tanaka et al. ................ 718/1 |
| 2004/0202189 | A1 | 10/2004 | Arndt et al. |
| 2005/0027900 | A1 * | 2/2005 | Pettey ................ 710/22 |
| 2005/0044301 | A1 * | 2/2005 | Vasilevsky et al. ................ 711/1 |
| 2005/0076157 | A1 | 4/2005 | Serizawa et al. |
| 2005/0091365 | A1 | 4/2005 | Lowell et al. |
| 2005/0097384 | A1 | 5/2005 | Uehara et al. |
| 2005/0102682 | A1 | 5/2005 | Rajesh et al. |
| 2005/0119996 | A1 | 6/2005 | Ohata et al. |
| 2005/0120160 | A1 | 6/2005 | Plouffe et al. |
| 2005/0177648 | A1 * | 8/2005 | Toyohara et al. ................ 710/1 |
| 2005/0182788 | A1 | 8/2005 | Arndt et al. |
| 2005/0240932 | A1 | 10/2005 | Billau et al. |
| 2005/0246450 | A1 | 11/2005 | Enko et al. |
| 2006/0044301 | A1 | 3/2006 | Ha |
| 2006/0069828 | A1 | 3/2006 | Goldsmith |
| 2006/0112376 | A1 | 5/2006 | Broberg et al. |
| 2006/0184349 | A1 | 8/2006 | Goud et al. |
| 2006/0239287 | A1 | 10/2006 | Johnsen et al. |
| 2006/0242330 | A1 | 10/2006 | Torudbakken et al. |
| 2006/0242332 | A1 | 10/2006 | Johnsen et al. |
| 2006/0242333 | A1 | 10/2006 | Johnsen et al. |
| 2006/0242352 | A1 | 10/2006 | Torudbakken et al. |
| 2006/0242354 | A1 | 10/2006 | Johnsen et al. |
| 2006/0253619 | A1 | 11/2006 | Torudbakken et al. |

OTHER PUBLICATIONS

U.S. Appl. No. 11/066,518, Arndt et al., System and Method of Virtual Resource Modification on a Physical Adapter that Supports Virtual Resources, Feb. 25, 2005.

U.S. Appl. No. 11/066,096, Arndt et al., System and Method for Destroying Virtual Resources in a Logically Partitioned Data Processing System, filed Feb. 25, 2005.

U.S. Appl. No. 11/068,664, Arndt et al., Method and System for Fully Trusted Adapter Validation of Addresses Referenced in a Virtual Host Transfer Request, filed Feb. 28, 2005.

U.S. Appl. No. 11/066,353, Arndt et al., System, Method, and Computer Program Product for a Fully Trusted Adapter Validation of Incoming Memory Mapped I/O Operations on a Physical Adapter that Supports Virtual Adapters or Virtual Resources, filed Feb. 25, 2005.

U.S. Appl. No. 11/065,830, Arndt et al., System and Method for Host Initialization for an Adapter that Supports Virtualization, filed Feb. 25, 2005.

U.S. Appl. No. 11/065,829, Arndt et al., Data Processing System, Method, and Computer Program Product for Creation and Initialization of a Virtual Adapter on a Physical Adapter that Supports Virtual Adapter Level Virtualization, filed Feb. 25, 2005.

U.S. Appl. No. 11/066,517, Arndt et al., System and Method for Virtual Resource Initialization on a Physical Adapter that Supports Virtual Resources, filed Feb. 25, 2005.

U.S. Appl. No. 11/065,821, Arndt et al., Method and System for Native Virtualization on a Partially Trusted Adapter Using Adapter Bus, Device and Function Number of Identification, filed Feb. 25, 2005.

U.S. Appl. No. 11/066,487, Arndt et al., Native Virtualization on a Partially Trusted Adapter Using PCI Host Memory Mapped Input/Output Memory Address for Identification, filed Feb. 25, 2005.

U.S. Appl. No. 11/066,517, Arndt et al., Native Virtualization on a Partially Trusted Adapter Using PCI Host Bus, Device, and Function Number for Identification, filed Feb. 25, 2005.

U.S. Appl. No. 11/068,521, Arndt et al., System and Method for Virtual Adapter Resource Allocation, filed Feb. 28, 2005.

U.S. Appl. No. 11/067,354, Arndt et al., System and Method for Providing Quality of Service in a Virtual Adapter, filed Feb. 25, 2005.

U.S. Appl. No. 11/066,590, Arndt et al., System and Method for Managing Metrics Table per Virtual Port In a Logically Partitioned Data Processing System, filed. Feb. 25, 2005.

U.S. Appl. No. 11/066,424, Arndt et al., Method, System and Program Product for Differentiating Between Virtual Hosts on Bus Transactions and Associating Allowable Memory Access for an Input/Output Adapter that Supports Virtualization, filed Feb. 25, 2005.

U.S. Appl. No. 11/066,645, Arndt et al., Virtualized I/O Adapter for a Multi-Processor Data Processing System, filed Feb. 25, 2005.

U.S. Appl. No. 11/065,869, Arndt et al., Virtualized Fibre Channel Adapter for a Multi-Processor Data Processing System, filed Feb. 28, 2005.

U.S. Appl. No. 11/065,951, Arndt et al., Interrupt Mechanism on an IO Adapter that Supports Virtualization, filed Feb. 25, 2005.

U.S. Appl. No. 11/066,419, Arndt et al., Association of Memory Access Through Protection Attributes that are Associated to an Access Control Level on a PCI Adapter that Supports Virtualization, filed. Feb. 25, 2005.

U.S. Appl. No. 11/066,931, Arndt et al., Association of Host Translations that are Associated to an Access Control Level on a PCI Bridge that Supports Virtualization, filed Feb. 25, 2005.

U.S. Appl. No. 11/065,823, Arndt et al., Method, Apparatus, and Computer Program Product for Coordinating Error Reporting and Reset Utilizing an I/O Adapter that Supports Virtualization, filed Feb. 25, 2005.

Jann et al., "Dynamic Reconfiguration: Basic Building Blocks for Autonomic Computing on IBM PSeries Servers," IBM System Journal, vol. 42, Jan. 2003 pp. 29-37.

"Logical Partition Security in the IBM @server pSeries 690", IBM, 2002, pp. 1-13.

Hensbergen, "The Effect of Virtualization on OS Interference", IBM Research, Proceedings of 1st workshop on Operating Systems Inteference in High Performance Applications, Aug. 2005, p. 1-6.

"Virtual Interface Architecture Specification", Version 1.0, Dec. 1997, pp. 11-12, 20-22, 55-57, 64-66, retrieved Apr. 19, 2006. http://rimonbarr.com/repository/cs614/san_10.pdf.

* cited by examiner

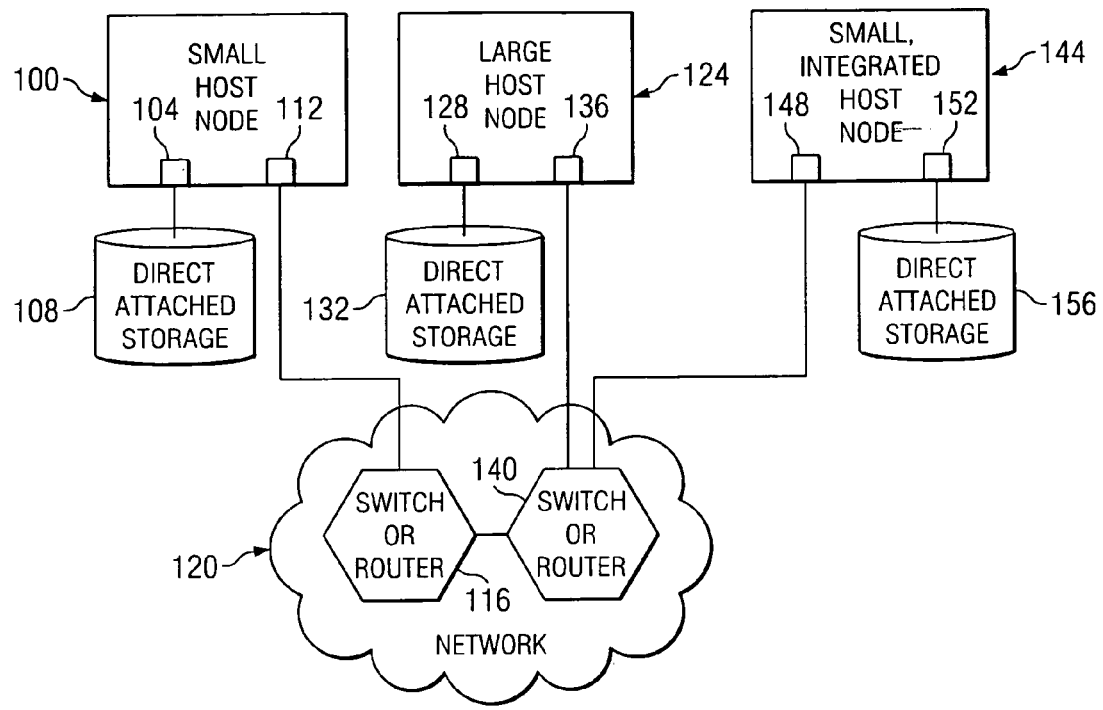
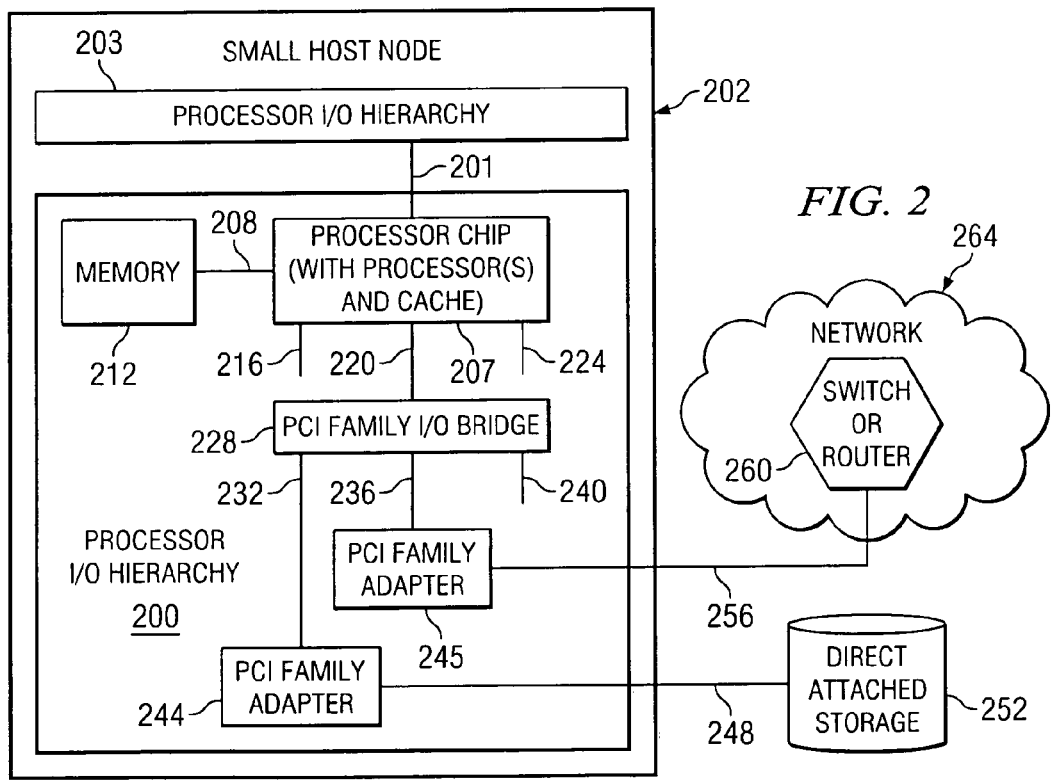

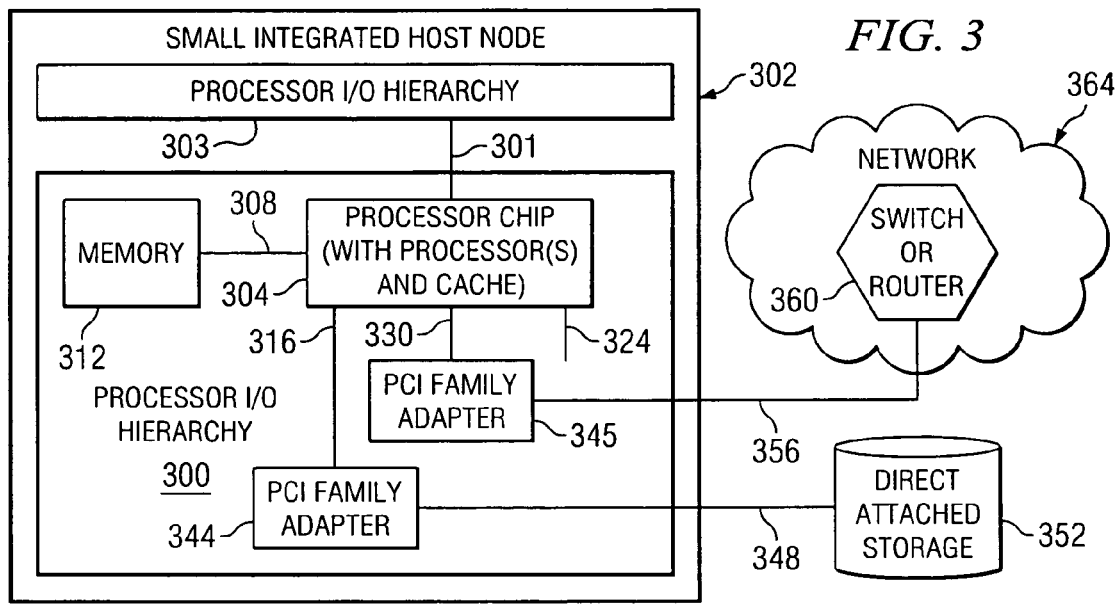

METHOD FOR VIRTUAL ADAPTER DESTRUCTION ON A PHYSICAL ADAPTER THAT SUPPORTS VIRTUAL ADAPTERS

CROSS-REFERENCE TO RELATED APPLICATIONS

This application is related to commonly assigned and U.S. patent application Ser. No. 11/066,424 entitled "Method, System and Program Product for Differentiating Between Virtual Hosts on Bus Transactions and Associating Allowable Memory Access for an Input/Output Adapter that Supports Virtualization"; U.S. patent application Ser. No. 11/066,645 entitled "Virtualized I/O Adapter for a Multi-Processor Data Processing System"; U.S. patent application Ser. No. 11/065,869 entitled "Virtualized Fibre Channel Adapter for a Multi-Processor Data Processing System"; U.S. Pat. No. 7,260,664, issued Aug. 21, 2007 entitled "Interrupt Mechanism on an I/O Adapter That Supports Virtualization"; U.S. Patent application Ser. No. 11/066,201 entitled "System and Method for Modification of Virtual Adapter Resources in a Logically Partitioned Data Processing System"; U.S. patent application Ser. No. 11/066,518 entitled "System and Method of Virtual Resource Modification on a Physical Adapter that Supports Virtual Resources"; U.S. patent application Ser. No. 11/066,096 entitled "System and Method for Destroying Virtual Resources in a Logically Partitioned Data Processing System"; U.S. patent application Ser. No. 11/066,419 entitled "Association of Memory Access Through Protection Attributes that are Associated to an Access Control Level on a PCI Adapter that Supports Virtualization"; U.S. patent application Ser. No. 11/066,931 entitled "Association of Host Translations that are Associated to an Access Control Level on a PCI Bridge that Supports Virtualization"; U.S. application Ser. No. 11/065,823 entitled "Method, apparatus, and Computer Program Product for Coordinating Error Reporting and Reset Utilizing an I/O Adapter that Supports Virtualization"; U.S. Patent application Ser. No. 11/068,664 entitled "Method and System for Fully Trusted Adapter Validation of Addresses Referenced in a Virtual Host Transfer Request"; U.S. patent application Ser. No. 11/066,353 entitled "System, Method, and Computer Program Product for a Fully Trusted Adapter Validation of Incoming Memory Mapped I/O Operations on a Physical Adapter that Supports Virtual Adapters or Virtual Resources"; U.S. patent application Ser. No. 11/065,830 entitled "System and Method for Host Initialization for an Adapter that Supports Virtualization"; U.S. patent application Ser. No. 11/065,829 entitled "Data Processing System, Method, and Computer Program Product for Creation and Initialization of a Virtual Adapter on a Physical Adapter that Supports Virtual Adapter Level Virtualization"; U.S. patent application Ser. No. 11/066,517 entitled "System and Method for Virtual Resource Initialization on a Physical Adapter that Supports Virtual Resources"; U.S. patent application Ser. No. 11/065,821 entitled "Method and System for Native Virtualization on a Partially Trusted Adapter Using Adapter Bus, Device and Function Number for Identification"; U.S. patent application Ser. No. 11/066,487 entitled "Native Virtualization on a Partially Trusted Adapter Using PCI Host Memory Mapped Input/Output Memory Address for Identification"; U.S. patent application Ser. No. 11/066,519 entitled "Native Virtualization on a Partially Trusted Adapter Using PCI Host Bus, Device, and Function Number for Identification; U.S. patent application Ser. No. 11/066,521 entitled "System and Method for Virtual Adapter Resource Allocation"; U.S. patent application Ser. No. 11/067,354 entitled "System and Method for Providing Quality of Service in a Virtual Adapter"; and U.S. patent application Ser. No. 11/066,590 entitled "System and Method for Managing Metrics Table per Virtual Port in a Logically Partitioned Data Processing System" all of which are hereby incorporated by reference.

BACKGROUND OF THE INVENTION

1. Technical Field

The present invention relates generally to communication protocols between a host computer and an input/output (I/O) adapter. More specifically, the present invention provides an implementation for virtualizing resources on a physical I/O adapter. In particular, the present invention provides a mechanism by which a single physical I/O adapter, such as a PCI, PCI-X, or PCI-E adapter, can destroy the resources associated with one or more virtual adapters that reside within the physical adapter.

2. Description of Related Art

Virtualization is the creation of substitutes for real resources. The substitutes have the same functions and external interfaces as their real counterparts, but differ in attributes such as size, performance, and cost. These substitutes are virtual resources and their users are usually unaware of the substitute's existence. Servers have used two basic approaches to virtualize system resources: Partitioning and logical partitioning (LPAR) managers. Partitioning creates virtual servers as fractions of a physical server's resources, typically in coarse (e.g. physical) allocation units (e.g., a whole processor, along with its associated memory and I/O adapters). LPAR managers are software or firmware components that can virtualize all server resources with fine granularity (e.g., in small fractions that of a single physical resource).

In conventional data processing systems, servers that support virtualization had two options for handling I/O. The first option was to not allow a single physical I/O adapter to be shared between virtual servers. The second option was to add functionality into a LPAR manager, or another intermediary, that provides the isolation necessary to permit multiple operating systems to share a single physical adapter.

The first option has several problems. One significant problem is that expensive adapters cannot be shared between virtual servers. If a virtual server only needs to use a fraction of an expensive adapter, an entire adapter would be dedicated to the server. As the number of virtual servers on the physical server increases, this leads to under-utilization of the adapters and more importantly a more expensive solution, because each virtual server needs a physical adapter dedicated to it. For physical servers that support many virtual servers, another significant problem with this option is that it requires many adapter slots, with all the accompanying hardware (e.g. chips, connectors, cables, and the like) required to attach those adapters to the physical server.

Though the second option provides a mechanism for sharing adapters between virtual servers, that mechanism must be invoked and executed on every I/O transaction. The invocation and execution of the sharing mechanism by the LPAR manager or other intermediary on every I/O transaction degrades performance. It also leads to a more expensive solution, because the customer must purchase more hardware either to make up for the cycles used to perform the sharing mechanism or, if the sharing mechanism is offloaded to an intermediary, for the intermediary hardware.

It would be advantageous to have an improved method, apparatus, and computer instructions for directly destroying the resources associated with one of more virtual adapters that reside within a physical adapter, such as a PCI, PCI-X, or PCI-E adapter. It would also be advantageous to have the mechanism apply for Ethernet NICs (Network Interface Controllers), FC (Fibre Channel) HBAs (Host Bus Adapters), pSCSI (parallel SCSI) HBAs, InfiniBand, TCP/IP Offload Engines, RDMA (Remote Direct Memory Access) enabled NICs (Network Interface Controllers), iSCSI adapters, iSER (iSCSI Extensions for RDMA) adapters, and any other type of adapter that supports a memory mapped I/O interface.

SUMMARY OF THE INVENTION

The present invention provides a method for directly destroying the resources associated with one or more virtual adapters that reside within a physical adapter, such as a PCI, PCI-X, or PCI-E adapter. Specifically, the present invention is directed to a mechanism for sharing conventional PCI (Peripheral Component Interconnect) I/O adapters, PCI-X I/O adapters, PCI-Express I/O adapters, and, in general, any I/O adapter that uses a memory mapped I/O interface for host to adapter communications. A mechanism is provided for directly destroying the resources associated with one or more virtual adapters that reside within a physical adapter, such as a PCI, PCI-X, or PCI-E adapter. Additionally, each virtual adapter has an associated set of host side resources, such as memory addresses and interrupt levels, and adapter side resources, such as adapter memory addresses and processing queues, and each virtual adapter is isolated from accessing the host side resources and adapter resources that belong to another virtual or physical adapter.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a diagram of a distributed computer system illustrated in accordance with a preferred embodiment of the present invention;

FIG. 2 is a functional block diagram of a small host processor node in accordance with a preferred embodiment of the present invention;

FIG. 3 is a functional block diagram of a small integrated host processor node in accordance with a preferred embodiment of the present invention;

FIG. 5 is a diagram illustrating the elements of the parallel Peripheral Computer Interface (PCI) bus protocol in accordance with a preferred embodiment of the present;

DETAILED DESCRIPTION OF THE PREFERRED EMBODIMENT

Figure 4:
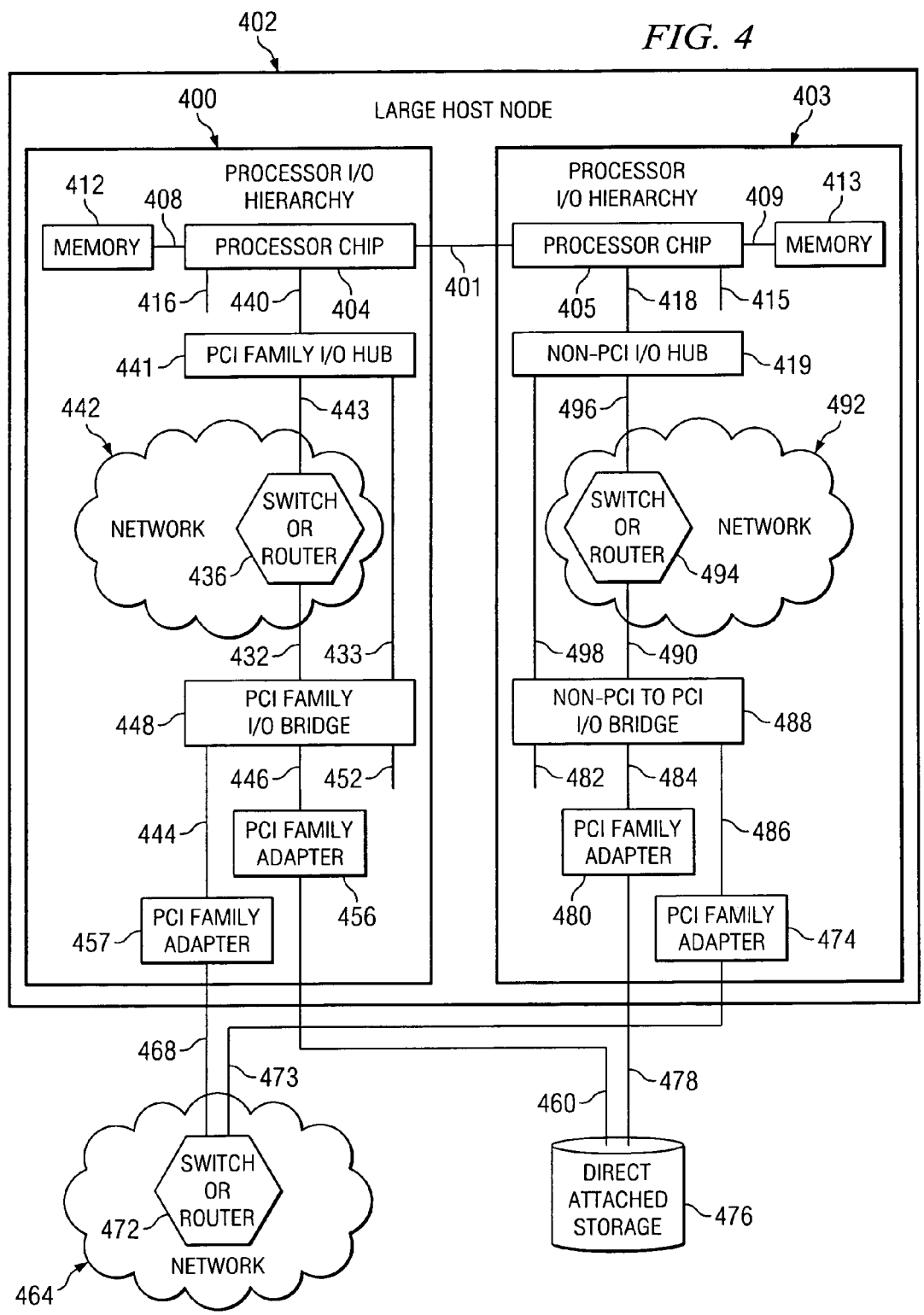
FIG. 4 is a functional block diagram of a large host processor node in accordance with a preferred embodiment of the present invention.

The present invention applies to any general or special purpose host that uses a PCI family I/O adapter to directly attach a storage device or to attach to a network, where the network consists of endnodes, switches, routers and the links interconnecting these components. The network links can be, for example, Fibre Channel, Ethernet, InfiniBand, Advanced Switching Interconnect, or a proprietary link that uses proprietary or standard protocols. While embodiments of the present invention are shown and described as employing a peripheral component interconnect (PCI) family adapter, implementations of the invention are not limited to such a configuration as will be apparent to those skilled in the art. Teachings of the invention may be implemented on any physical adapter that support a memory mapped input/output (MMIO) interface, such as, but not limited to, HyperTransport, Rapid I/O, proprietary MMIO interfaces, or other adapters having a MMIO interface now know or later developed. Implementations of the present invention utilizing a PCI family adapter are provided for illustrative purposes to facilitate an understanding of the invention.

With reference now to the figures and in particular with reference to FIG. 1, a diagram of a distributed computer system is illustrated in accordance with a preferred embodiment of the present invention. The distributed computer system represented in FIG. 1 takes the form of a network, such as network 120, and is provided merely for illustrative purposes and the embodiments of the present invention described below can be implemented on computer systems of numerous other types and configurations. Two switches (or routers) are shown inside of network 120—switch 116 and switch 140. Switch 116 connects to small host node 100 through port 112. Small host node 100 also contains a second type of port 104 which connects to a direct attached storage subsystem, such as direct attached storage 108.

Network 120 can also attach large host node 124 through port 136 which attaches to switch 140. Large host node 124 can also contain a second type of port 128, which connects to a direct attached storage subsystem, such as direct attached storage 132.

Network 120 can also attach a small integrated host node which is connected to network 120 through port 148 which attaches to switch 140. Small integrated host node 144 can also contain a second type of port 152 which connects to a direct attached storage subsystem, such as direct attached storage 156.

Turning next to FIG. 2, a functional block diagram of a small host node is depicted in accordance with a preferred embodiment of the present invention. Small host node 202 is an example of a host processor node, such as small host node 100 shown in FIG. 1.

In this example, small host node 202, shown in FIG. 2, includes two processor I/O hierarchies, such as processor I/O hierarchy 200 and 203, which are interconnected through link 201. In the illustrative example of FIG. 2, processor I/O hierarchy 200 includes processor chip 207 which includes one or more processors and their associated caches. Processor chip 207 is connected to memory 212 through link 208. One of the links on processor chip, such as link 220, connects to PCI family I/O bridge 228. PCI family I/O bridge 228 has one or more PCI family (PCI, PCI-X, PCI-Express, or any future generation of PCI) links that is used to connect other PCI family I/O bridges or a PCI family I/O adapter, such as PCI family adapter 244 and PCI family adapter 245, through a PCI link, such as link 232, 236, and 240. PCI family adapter 245 can also be used to connect a network, such as network 264, through a link via either a switch or router, such as switch or router 260. PCI family adapter 244 can be used to connect direct attached storage, such as direct attached storage 252, through link 248. Processor I/O hierarchy 203 may be configured in a manner similar to that shown and described with reference to processor I/O hierarchy 200.

With reference now to FIG. 3, a functional block diagram of a small integrated host node is depicted in accordance with a preferred embodiment of the present invention. Small integrated host node 302 is an example of a host processor node, such as small integrated host node 144 shown in FIG. 1.

In this example, small integrated host node 302 includes two processor I/O hierarchies 300 and 303, which are interconnected through link 301. In the illustrative example, processor I/O hierarchy 300 includes processor chip 304, which is representative of one or more processors and associated caches. Processor chip 304 is connected to memory 312 through link 308. One of the links on the processor chip, such as link 330, connects to a PCI Family adapter, such as PCI family adapter 345. Processor chip 304 has one or more PCI family (i.e., PCI, PCI-X, PCI-Express, or any future generation of PCI) links that is used to connect either PCI family I/O bridges or a PCI family I/O adapter, such as PCI family adapter 344 and PCI family adapter 345 through a PCI link, such as link 316, 330, and 324. PCI family adapter 345 can also be used to connect with a network, such as network 364, through link 356 via either a switch or router, such as switch or router 360. PCI family adapter 344 can be used to connect with direct attached storage 352 through link 348.

Turning now to FIG. 4, a functional block diagram of a large host node is depicted in accordance with a preferred embodiment of the present invention. Large host node 402 is an example of a host processor node, such as large host node 124 shown in FIG. 1.

In this example, large host node 402 includes two processor I/O hierarchies 400 and 403 interconnected through link 401. In the illustrative example of FIG. 4, processor I/O hierarchy 400 includes processor chip 404, which is representative of one or more processors and associated caches. Processor chip 404 is connected to memory 412 through link 408. One of the links, such as link 440, on the processor chip connects to a PCI family I/O hub, such as PCI family I/O hub 441. The PCI family I/O hub uses a network 442 to attach to a PCI family I/O bridge 448. That is, PCI family I/O bridge 448 is connected to switch or router 436 through link 432 and switch or router 436 also attaches to PCI family I/O hub 441 through link 443. Network 442 allows the PCI family I/O hub and PCI family I/O bridge to be placed in different packages. PCI family I/O bridge 448 has one or more PCI family (i.e., PCI, PCI-X, PCI-Express, or any future generation of PCI) links that is used to connect with other PCI family I/O bridges or a PCI family I/O adapter, such as PCI family adapter 456 and PCI family adapter 457 through a PCI link, such as link 444, 446, and 452. PCI family adapter 456 can be used to connect direct attached storage 476 through link 460. PCI family adapter 457 can also be used to connect with network 464 through link 468 via, for example, either a switch or router 472.

Turning next to FIG. 5, illustrations of the phases contained in a PCI bus transaction 500 and a PCI-X bus transaction 520 are depicted in accordance with a preferred embodiment of the present invention. PCI bus transaction 500 depicts the conventional PCI bus transaction that forms the unit of information which is transferred through a PCI fabric for conventional PCI. PCI-X bus transaction 520 depicts the PCI-X bus transaction that forms the unit of information which is transferred through a PCI fabric for PCI-X.

PCI bus transaction 500 shows three phases: an address phase 508; a data phase 512; and a turnaround cycle 516. Also depicted is the arbitration for next transfer 504, which can occur simultaneously with the address, data, and turnaround cycle phases. For PCI, the address contained in the address phase is used to route a bus transaction from the adapter to the host and from the host to the adapter.

PCI-X transaction 520 shows five phases: an address phase 528; an attribute phase 532; a response phase 560; a data phase 564; and a turnaround cycle 566. Also depicted is the arbitration for next transfer 524 which can occur simultaneously with the address, attribute, response, data, and turnaround cycle phases. Similar to conventional PCI, PCI-X uses the address contained in the address phase to route a bus transaction from the adapter to the host and from the host to the adapter. However, PCI-X adds the attribute phase 532 which contains three fields that define the bus transaction requester, namely: requester bus number 544, requester device number 548, and requestor function number 552 (collectively referred to herein as a BDF). The bus transaction also contains a tag 540 that uniquely identifies the specific bus transaction in relation to other bus transactions that are outstanding between the requester and a responder. The byte count 556 contains a count of the number of bytes being sent.

Figure 6:
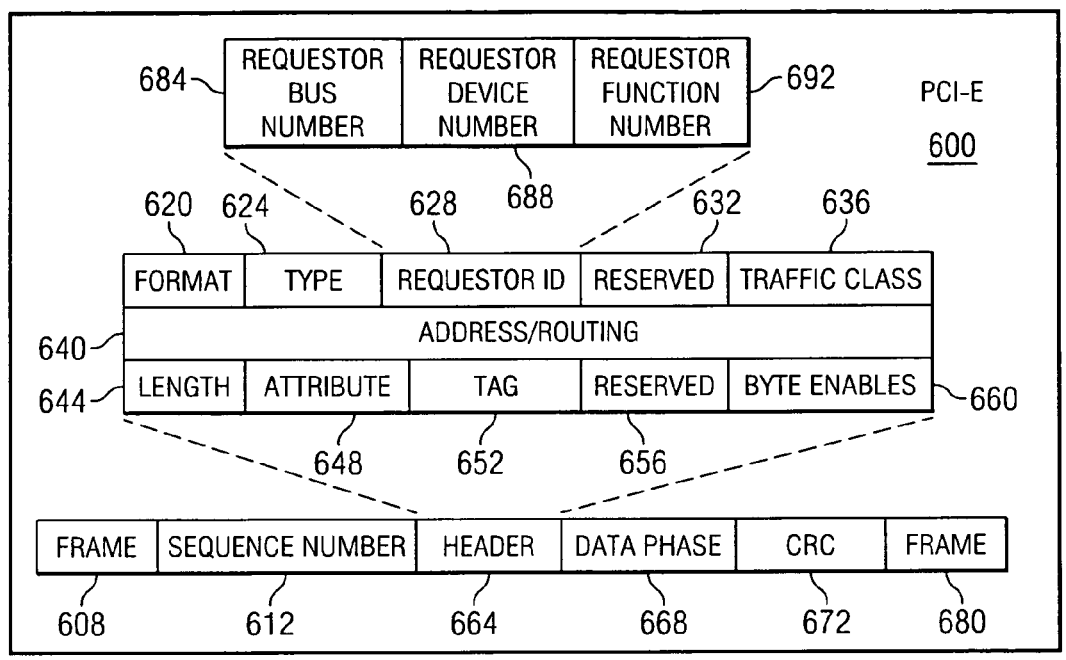
FIG. 6 is a diagram illustrating the elements of the serial PCI bus protocol (PCI-Express or PCI-E) in accordance with a preferred embodiment of the present.

Turning now to FIG. 6, an illustration of the phases contained in a PCI-Express bus transaction is depicted in accordance with a preferred embodiment of the present invention. PCI-E bus transaction 600 forms the unit of information which is transferred through a PCI fabric for PCI-E.

PCI-E bus transaction 600 shows six phases: frame phase 608; sequence number 612; header 664; data phase 668; cyclical redundancy check (CRC) 672; and frame phase 680. PCI-E header 664 contains a set of fields defined in the PCI-Express specification. The requestor identifier (ID) field 628 contains three fields that define the bus transaction requestor, namely: requestor bus number 684, requester device number 688, and requester function number 692. The PCI-E header also contains tag 652, which uniquely identifies the specific bus transaction in relation to other bus transactions that are outstanding between the requestor and a responder. The length field 644 contains a count of the number of bytes being sent.

Figure 7:
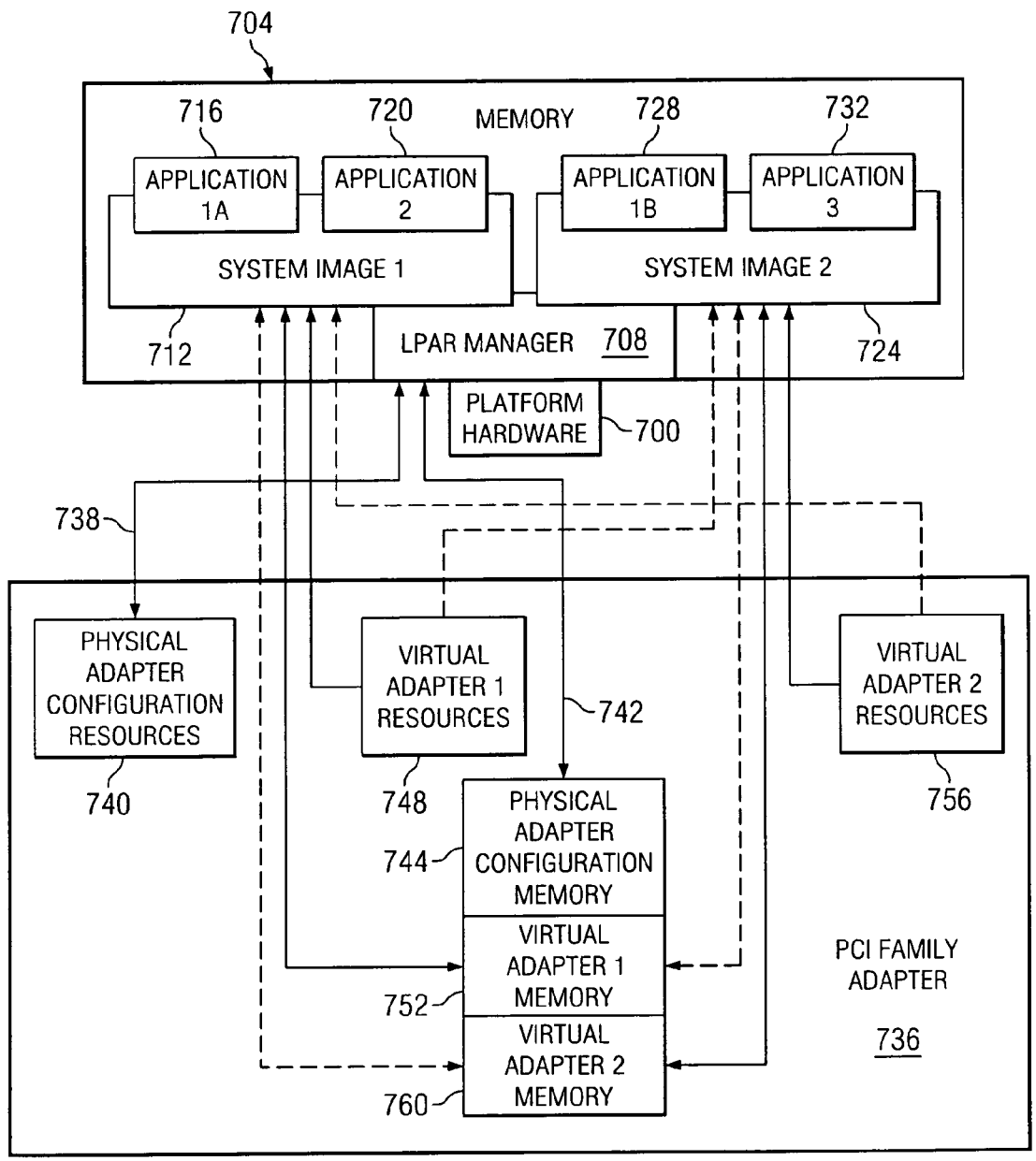
FIG. 7 is a diagram illustrating I/O virtualization functions provided in a host processor node in order to provide virtual host access isolation in accordance with a preferred embodiment of the present invention.

With reference now to FIG. 7, a functional block diagram of a PCI adapter, such as PCI family adapter 736, and the firmware and software that run on host hardware (e.g., processor with possibly an I/O hub or I/O bridge), such as host hardware 700, is depicted in accordance with a preferred embodiment of the present invention.

FIG. 7 also shows a logical partitioning (LPAR) manager 708 running on host hardware 700. LPAR manager 708 may be implemented as a Hypervisor manufactured by International Business Machines, Inc. of Armonk, N.Y. LPAR manager 708 can run in firmware, software, or a combination of the two. LPAR manager 708 hosts two system image (SI) partitions, such as system image 712 and system image 724 (illustratively designated system image 1 and system image 2). The System image partitions may be respective operating systems running in software, a special purpose image running in software, such as a storage block server or storage file server image, or a special purpose image running in firmware. Applications can run on these system images, such as applications 716, 720, 728, and 732 (illustratively designated application 1A, application 2, application 1B and application 3). Applications 716 and 728 are representative of separate instances of a common application program, and are thus illustratively designated with respective references of "1A" and "1B". In the illustrative example, application 716 and 720 run on system image 712 and applications 728 and 732 run on system image 724. As referred to herein, a virtual host comprises a system image, such as system image 712, or the combination of a system image and applications running within the system image. Thus, two virtual hosts are depicted in FIG. 7.

PCI family adapter 736 contains a set of physical adapter configuration resources 740 and physical adapter memory resources 744. The physical adapter configuration resources 740 and physical adapter memory resources 744 contain information describing the number of virtual adapters that PCI family adapter 736 can support and the physical resources allocated to each virtual adapter. As referred to herein, a virtual adapter is an allocation of a subset of physical adapter resources, such as a subset of physical adapter resources and physical adapter memory, that is associated with a logical partition, such as system image 712 and applications 716 and 720 running on system image 712. LPAR manager 708 is provided a physical configuration resource interface 738, and physical memory configuration interface 742 to read and write into the physical adapter configuration resource and memory spaces during the adapter's initial configuration and reconfiguration. Through the physical configuration resource interface 738 and physical configuration memory interface 742, LPAR manager 708 creates virtual adapters and assigns physical resources to each virtual adapter. The LPAR manager 708 may use one of the system images, for example a special software or firmware partition, as a hosting partition that uses physical configuration resource interface 738 and physical configuration memory interface 742 to perform a portion, or even all, of the virtual adapter initial configuration and reconfiguration functions.

FIG. 7 shows a configuration of PCI family adapter 736 configured with two virtual adapters. A first virtual adapter (designated virtual adapter 1) comprises virtual adapter resources 748 and virtual adapter memory 752 that were assigned by LPAR manager 708 that is associated with system image 712 (designated system image 1). Similarly, a second virtual adapter (designated virtual adapter 2) comprises virtual adapter resources 756 and virtual adapter memory 760 that were assigned by LPAR manager 708 to virtual adapter 2 and is associated with another system image 724 (designated system image 2). For an adapter used to connect to a direct attached storage, such as direct attached storage 108, 132, or 156 shown in FIG. 1, examples of virtual adapter resources may include: the list of the associated physical disks, a list of the associated logical unit numbers, and a list of the associated adapter functions (e.g., redundant arrays of inexpensive disks (RAID) level). For an adapter used to connect to a network, such as network 120 of FIG. 1, examples of virtual adapter resources may include: the list of the associated link level identifiers, a list of the associated network level identifiers, a list of the associated virtual fabric identifiers (e.g. Virtual LAN IDs for Ethernet fabrics, N-port IDs for Fibre Channel fabrics, and partition keys for InfiniBand fabrics), and a list of the associated network layers functions (e.g., network offload services).

After LPAR manager 708 configures the PCI family adapter 736, each system image is allowed to only communicate with the virtual adapters that were associated with that system image by LPAR manager 708. As shown in FIG. 7 (by solid lines), system image 712 is allowed to directly communicate with virtual adapter resources 748 and virtual adapter memory 752 of virtual adapter 1. System image 712 is not allowed to directly communicate with virtual adapter resources 756 and virtual adapter memory 760 of virtual adapter 2 as shown in FIG. 7 by dashed lines. Similarly, system image 724 is allowed to directly communicate with virtual adapter resources 756 and virtual adapter memory 760 of virtual adapter 2, and is not allowed to directly communicate with virtual adapter resources 748 and virtual adapter memory 752 of virtual adapter 1.

Figure 8:
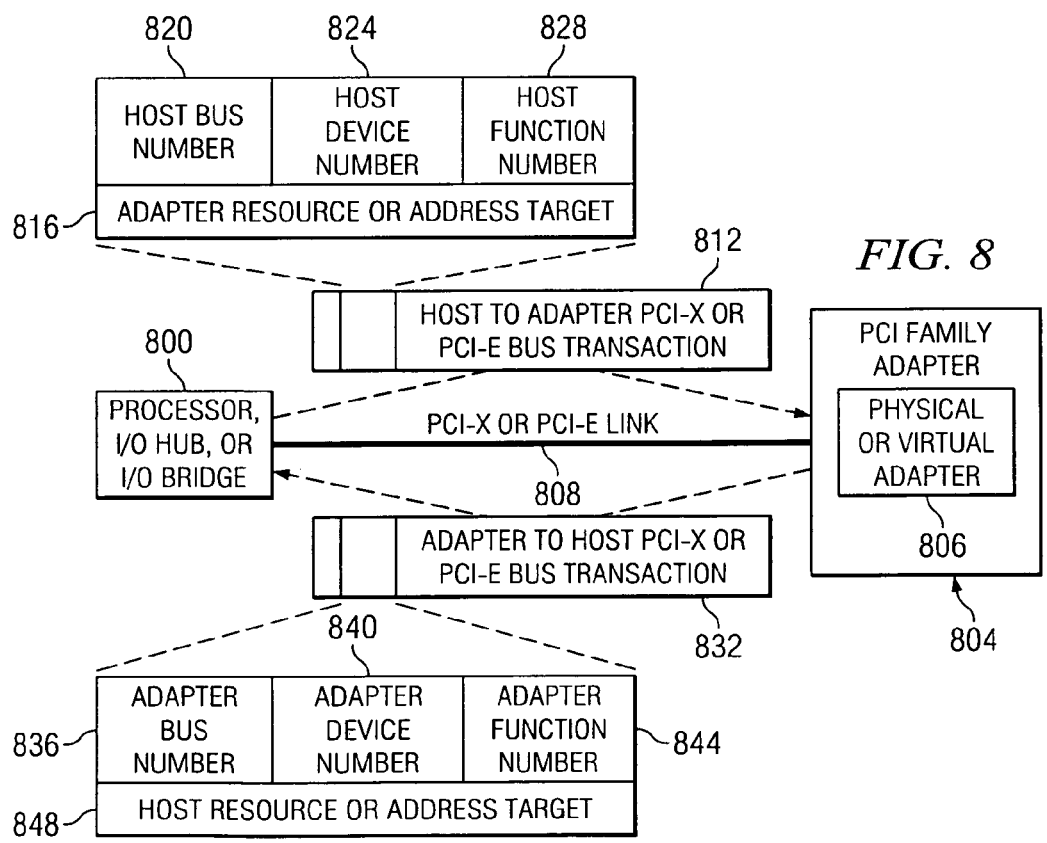
FIG. 8 is a diagram illustrating the control fields used in a PCI bus transaction to identify a virtual adapter or system image in accordance with a preferred embodiment of the present invention.

With reference now to FIG. 8, a depiction of a component, such as a processor, I/O hub, or I/O bridge 800, inside a host node, such as small host node 100, large host node 124, or small, integrated host node 144 shown in FIG. 1, that attaches a PCI family adapter, such as PCI family adapter 804, through a PCI-X or PCI-E link, such as PCI-X or PCI-E Link 808, in accordance with a preferred embodiment of the present invention is shown.

FIG. 8 shows that when a system image, such as system image 712 or 724, or LPAR manager 708, performs a PCI-X or PCI-E bus transaction, such as host to adapter PCI-X or PCI-E bus transaction 812, the processor, I/O hub, or I/O bridge 800 that connects to the PCI-X or PCI-E link 808 which issues the host to adapter PCI-X or PCI-E bus transaction 812 fills in the bus number, device number, and function number fields in the PCI-X or PCI-E bus transaction. The processor, I/O hub, or I/O bridge 800 has two choices for how to fill in these three fields: it can either use the same bus number, device number, and function number for all software components that use the processor, I/O hub, or I/O bridge 800; or it can use a different bus number, device number, and function number for each software component that uses the processor, I/O hub, or I/O bridge 800. The initiator of the transaction may be a software component, such as system image 712 or system image 724 (or an application running on a system image), or LPAR manager 708.

If the processor, I/O hub, or I/O bridge 800 uses the same bus number, device number, and function number for all transaction initiators, then when a software component initiates a PCI-X or PCI-E bus transaction, such as host to adapter PCI-X or PCI-E bus transaction 812, the processor, I/O hub, or I/O bridge 800 places the processor, I/O hub, or I/O bridge's bus number in the PCI-X or PCI-E bus transaction's requestor bus number field 820, such as requestor bus number 544 field of the PCI-X transaction shown in FIG. 5 or requester bus number 684 field of the PCI-E transaction shown in FIG. 6. Similarly, the processor, I/O hub, or I/O bridge 800 places the processor, I/O hub, or I/O bridge's device number in the PCI-X or PCI-E bus transaction's requestor device number 824 field, such as requestor device number 548 field shown in FIG. 5 or requester device number 688 field shown in FIG. 6. Finally, the processor, I/O hub, or I/O bridge 800 places the processor, I/O hub, or I/O bridge's function number in the PCI-X or PCI-E bus transaction's requestor function number 828 field, such as requestor function number 552 field shown in FIG. 5 or requester function number 692 field shown in FIG. 6. The processor, I/O hub, or I/O bridge 800 also places in the PCI-X or PCI-E bus transaction the physical or virtual adapter memory address to which the transaction is targeted as shown by adapter resource or address 816 field in FIG. 8.

If the processor, I/O hub, or I/O bridge 800 uses a different bus number, device number, and function number for each transaction initiator, then the processor, I/O hub, or I/O bridge 800 assigns a bus number, device number, and function number to the transaction initiator. When a software component initiates a PCI-X or PCI-E bus transaction, such as host to adapter PCI-X or PCI-E bus transaction 812, the processor, I/O hub, or I/O bridge 800 places the software component's bus number in the PCI-X or PCI-E bus transaction's requestor bus number 820 field, such as requestor bus number 544 field shown in FIG. 5 or requester bus number 684 field shown in FIG. 6. Similarly, the processor, I/O hub, or I/O bridge 800 places the software component's device number in the PCI-X or PCI-E bus transaction's requestor device number 824 field, such as requestor device number 548 field shown in FIG. 5 or requestor device number 688 field shown in FIG. 6. Finally, the processor, I/O hub, or I/O bridge 800 places the software component's function number in the PCI-X or PCI-E bus transaction's requestor function number 828 field, such as requestor function number 552 field shown in FIG. 5 or requester function number 692 field shown in FIG. 6. The processor, I/O hub, or I/O bridge 800 also places in the PCI-X or PCI-E bus transaction the physical or virtual adapter memory address to which the transaction is targeted as shown by adapter resource or address field 816 in FIG. 8.

FIG. 8 also shows that when physical or virtual adapter 806 performs PCI-X or PCI-E bus transactions, such as adapter to host PCI-X or PCI-E bus transaction 832, the PCI family adapter, such as physical family adapter 804, that connects to PCI-X or PCI-E Link 808 which issues the adapter to host PCI-X or PCI-E bus transaction 832 places the bus number, device number, and function number associated with the physical or virtual adapter that initiated the bus transaction in the requestor bus number, device number, and function number 836, 840, and 844 fields. Notably, to support more than one bus or device number, PCI family adapter 804 must support one or more internal busses (for a PCI-X adapter, see the PCI-X Addendum to the PCI Local Bus Specification Revision 1.0 or 1.0a; for a PCI-E Adapter see PCI-Express Base Specification Revision 1.0 or 1.0a the details of which are herein incorporated by reference). To perform this function, LPAR manager 708 associates each physical or virtual adapter to a software component running by assigning a bus number, device number, and function number to the physical or virtual adapter. When the physical or virtual adapter initiates an adapter to host PCI-X or PCI-E bus transaction, PCI family adapter 804 places the physical or virtual adapter's bus number in the PCI-X or PCI-E bus transaction's requester bus number 836 field, such as requester bus number 544 field shown in FIG. 5 or requester bus number 684 field shown in FIG. 6 (shown in FIG. 8 as adapter bus number 836). Similarly, PCI family adapter 804 places the physical or virtual adapter's device number in the PCI-X or PCI-E bus transaction's requestor device number 840 field, such as requestor device Number 548 field shown in FIG. 5 or requestor device number 688 field shown in FIG. 6 (shown in FIG. 8 as adapter device number 840). PCI family adapter 804 places the physical or virtual adapter's function number in the PCI-X or PCI-E bus transaction's requestor function number 844 field, such as requester function number 552 field shown in FIG. 5 or requestor function number 692 field shown in FIG. 6 (shown in FIG. 8 as adapter function number 844). Finally, PCI family adapter 804 also places in the PCI-X or PCI-E bus transaction the memory address of the software component that is associated, and targeted by, the physical or virtual adapter in host resource or address 848 field.

Figure 9:
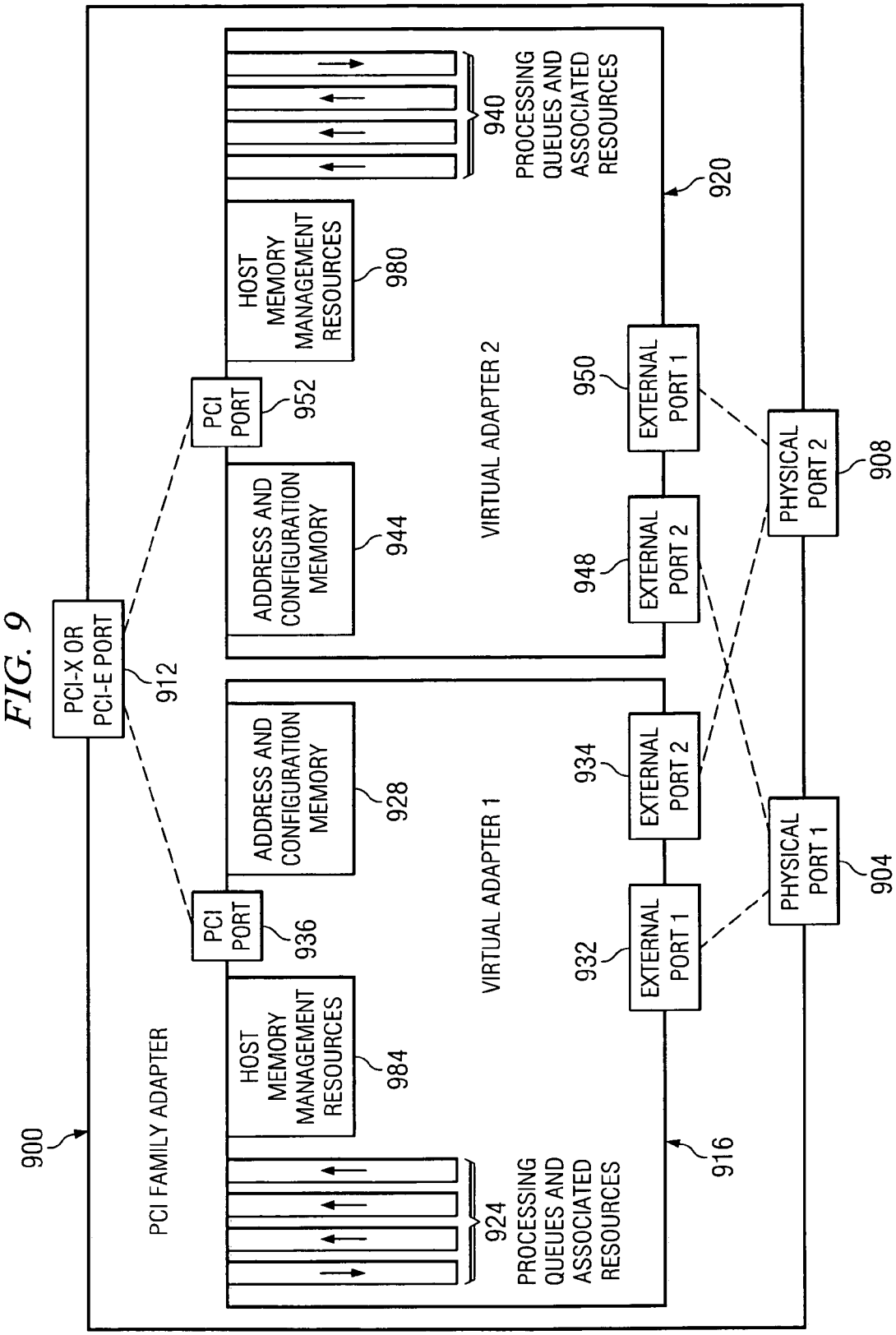
FIG. 9 is a diagram illustrating adapter resources that must be virtualized in order to allow: an adapter to directly access virtual host resources; allow a virtual host to directly access Adapter resources; and allow a non-PCI port on the adapter to access resources on the adapter or host in accordance with a preferred embodiment of the present invention.

With reference now to FIG. 9, a functional block diagram of a PCI adapter with two virtual adapters depicted in accordance with a preferred embodiment of the present invention is shown. Exemplary PCI family adapter 900 is configured with two virtual adapters 916 and 920 (illustratively designated virtual adapter 1 and virtual adapter 2). PCI family adapter 900 may contain one (or more) PCI family adapter ports (also referred to herein as an upstream port), such as PCI-X or PCI-E adapter port 912. PCI family adapter 900 may also contain one (or more) device or network ports (also referred to herein as downstream ports), such as physical port 904 and physical port 908.

FIG. 9 also shows the types of resources that can be virtualized on a PCI adapter. The resources of PCI family adapter 900 that may be virtualized include processing queues, address and configuration memory, PCI ports, host memory management resources and device or network ports. In the illustrative example, virtualized resources of PCI family adapter 900 allocated to virtual adapter 916 include, for example, processing queues 924, address and configuration memory 928, PCI virtual port 936, host memory management resources 984 (such as memory region registration and memory window binding resources on InfiniBand or iWARP), and virtual device or network ports, such as virtual external port 932 and virtual external port 934 (more generally referred to as virtual ports). Similarly, virtualized resources of PCI family adapter 900 allocated to virtual adapter 920 include, for example, processing queues 940, address and configuration memory 944, PCI virtual port 952, host memory management resources 980, and virtual device or network ports, such as virtual external port 948 and virtual external port 950.

Figure 10:
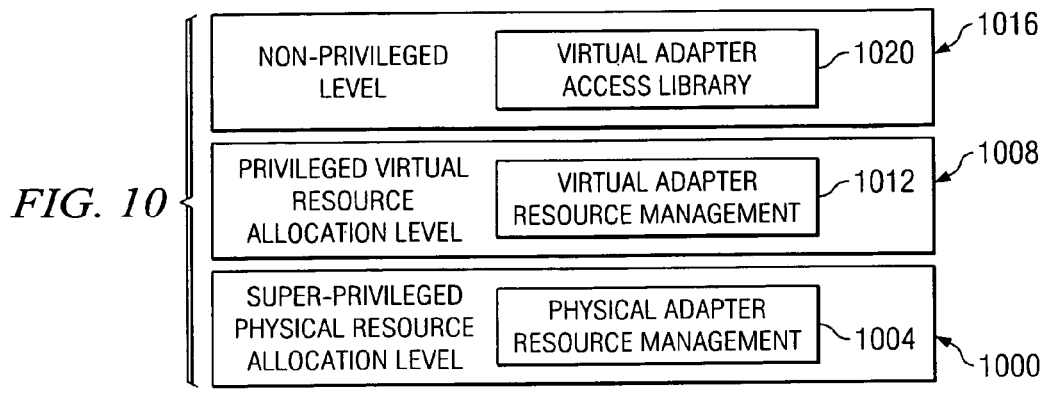
FIG. 10 is a diagram illustrating the creation of three access control levels used to manage a PCI family adapter that supports I/O virtualization in accordance with a preferred embodiment of the present invention.

Turning next to FIG. 10, a functional block diagram of the access control levels on a PCI family adapter, such as PCI family adapter 900 shown in FIG. 9, is depicted in accordance with a preferred embodiment of the present invention. The three levels of access are a super-privileged physical resource allocation level 1000, a privileged virtual resource allocation level 1008, and a non-privileged level, 1016.

The functions performed at the super-privileged physical resource allocation level 1000 include but are not limited to:

PCI family adapter queries, creation, modification and deletion of virtual adapters, submission and retrieval of work, reset and recovery of the physical adapter, and allocation of physical resources to a virtual adapter instance. The PCI family adapter queries are used to determine, for example, the physical adapter, type (e.g., Fibre Channel, Ethernet, iSCSI, parallel SCSI), the functions supported on the physical adapter, and the number of virtual adapters supported by the PCI family adapter. The LPAR manager, such as LPAR manager 708 shown in FIG. 7, performs the physical adapter resource management 1004 functions associated with super-privileged physical resource allocation level 1000. However, the LPAR manager may use a system image, for example an I/O hosting partition, to perform the physical adapter resource management 1004 functions.

The functions performed at the privileged virtual resource allocation level 1008 include, for example, virtual adapter queries, allocation and initialization of virtual adapter resources, reset and recovery of virtual adapter resources, submission and retrieval of work through virtual adapter resources, and, for virtual adapters that support offload services, allocation and assignment of virtual adapter resources to a middleware process or thread instance. The virtual adapter queries are used to determine: the virtual adapter type (e.g., Fibre Channel, Ethernet, iSCSI, parallel SCSI) and the functions supported on the virtual adapter. A system image, such as system image 712 shown in FIG. 7, performs the privileged virtual adapter resource management 1012 functions associated with virtual resource allocation level 1008.

Finally, the functions performed at the non-privileged level 1016 include, for example, query of virtual adapter resources that have been assigned to software running at the non-privileged level 1016 and submission and retrieval of work through virtual adapter resources that have been assigned to software running at the non-privileged level 1016. An application, such as application 716 shown in FIG. 7, performs the virtual adapter access library 1020 functions associated with non-privileged level 1016.

Figure 11:
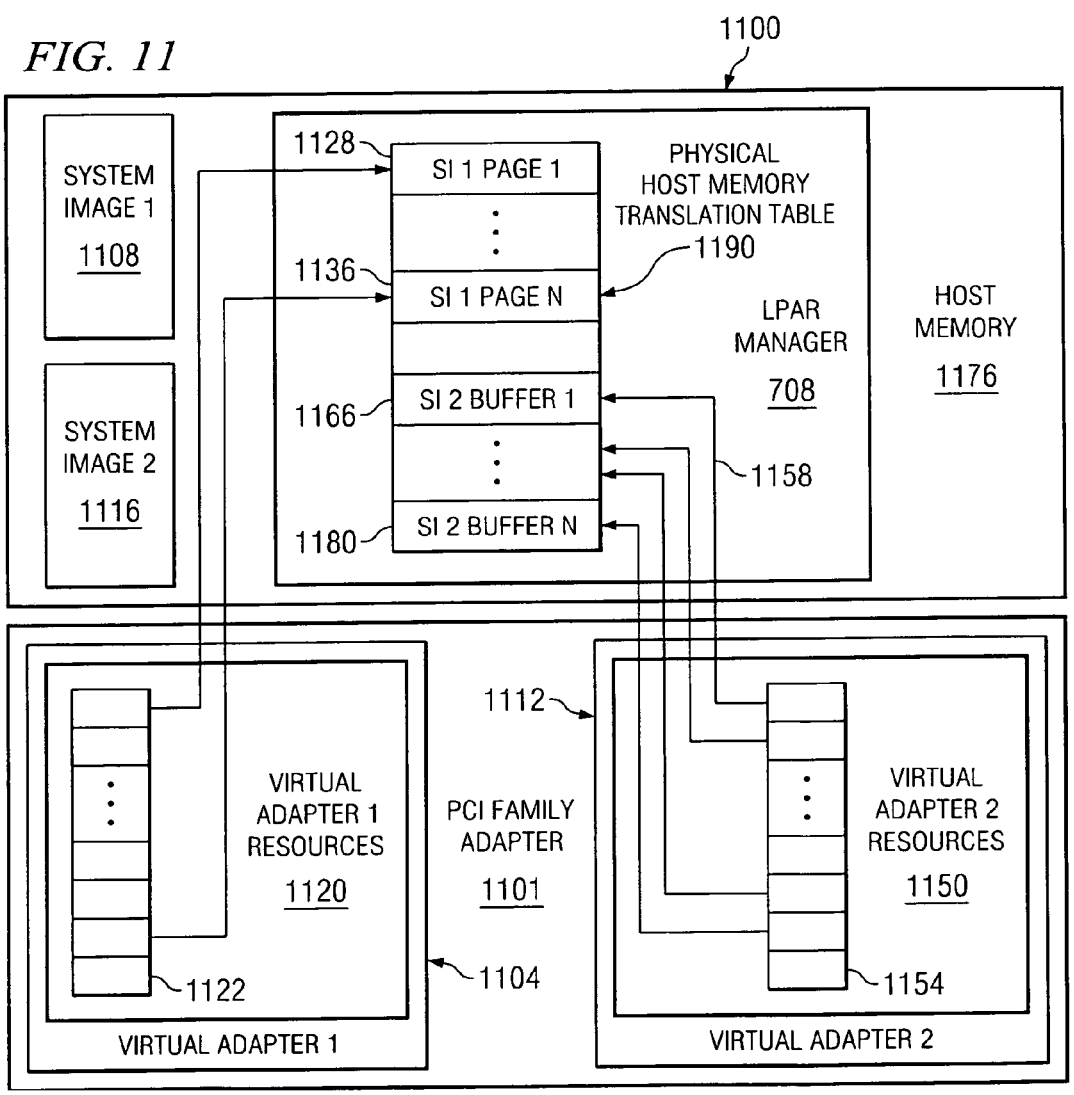
FIG. 11 is a diagram illustrating how host memory that is associated with a system image is made available to a virtual adapter that is associated with that system image through the logical partitioning manager in accordance with a preferred embodiment of the present invention.

Turning next to FIG. 11, a functional block diagram of host memory addresses that are made accessible to a PCI family adapter is depicted in accordance with a preferred embodiment of the present invention. PCI family adapter 1101 is an example of PCI family adapter 900 that may have virtualized resources as described above in FIG. 9.

FIG. 11 depicts four different mechanisms by which a LPAR manager 708 can associate host memory to a system image and to a virtual adapter. Once host memory has been associated with a system image and a virtual adapter, the virtual adapter can then perform DMA write and read operations directly to the host memory. System images 1108 and 1116 are examples of system images, such as system images 712 and 724 described above with reference to FIG. 7, that are respectively associated with virtual adapters 1104 and 1112. Virtual adapters 1104 and 1112 are examples of virtual adapters, such as virtual adapters 916 and 920 described above with reference to FIG. 9, that comprise respective allocations of virtual adapter resources and virtual adapter memory.

The first exemplary mechanism that LPAR manager 708 can use to associate and make available host memory to a system image and to one or more virtual adapters is to write into the virtual adapter's resources a system image association list 1122. Virtual adapter resources 1120 contains a list of PCI bus addresses, where each PCI bus address in the list is associated by the platform hardware to the starting address of a system image (SI) page, such as SI 1 page 1 1128 through SI 1 page N 1136 allocated to system image 1108. Virtual adapter resources 1120 also contain the page size, which is equal for all the pages in the list. At initial configuration, and during reconfigurations, LPAR manager 708 loads system image association list 1122 into virtual adapter resources 1120. The system image association list 1122 defines the set of addresses that virtual adapter 1104 can use in DMA write and read operations. After the system image association list 1122 has been created, virtual adapter 1104 must validate that each DMA write or DMA read requested by system image 1108 is contained within a page in the system image association list 1122. If the DMA write or DMA read requested by system image 1108 is contained within a page in the system image association list 1122, then virtual adapter 1104 may perform the operation. Otherwise virtual adapter 1104 is prohibited from performing the operation. Alternatively, the PCI family adapter 1101 may use a special, LPAR manager-style virtual adapter (rather than virtual adapter 1104) to perform the check that determines if a DMA write or DMA read requested by system image 1108 is contained within a page in the system image association list 1122. In a similar manner, virtual adapter 1112 associated with system image 1116 validates DMA write or read requests submitted by system image 1116. Particularly, virtual adapter 1112 provides validation for DMA read and write requests from system image 1116 by determining whether the DMA write or read request is in a page in system image association list (configured in a manner similarly to system image association list 1122) associated with system image pages of system image 1116.

The second mechanism that LPAR manager 708 can use to associate and make available host memory to a system image and to one or more virtual adapters is to write a starting page address and page size into system image association list 1122 in the virtual adapter's resources. For example, virtual adapter resources 1120 may contain a single PCI bus address that is associated by the platform hardware to the starting address of a system image page, such as SI 1 Page 1 1128. System image association list 1122 in virtual adapter resources 1120 also contains the size of the page. At initial configuration, and during reconfigurations, LPAR manager 708 loads the page size and starting page address into system image association list 1122 into the virtual adapter resources 1120. The system image association list 1122 defines the set of addresses that virtual adapter 1104 can use in DMA write and read operations. After the system image association list 1122 has been created, virtual adapter 1104 validates whether each DMA write or DMA read requested by system image 1108 is contained within a page in system image association list 1122. If the DMA write or DMA read requested by system image 1108 is contained within a page in the system image association list 1122, then virtual adapter 1104 may perform the operation. Otherwise, virtual adapter 1104 is prohibited from performing the operation. Alternatively, the PCI family adapter 1101 may use a special, LPAR manager-style virtual adapter (rather than virtual adapter 1104) to perform the check that determines if a DMA write or DMA read requested by system image 1108 is contained within a page in the system image association list 1122. In a similar manner, virtual adapter 1112 associated with system image 1116 may validate DMA write or read requests submitted by system image 1116. Particularly, a system image association list similar to system image association list 1122 may be associated with virtual adapter 1112. The system image association list associated with virtual adapter 1112 is loaded with a page size and starting page address of a system image page of system image 1116 associated with virtual adapter 1112. The system image association list associated with virtual adapter 1112 thus provides a mechanism for validation of DMA read and write requests from system image 1116 by determining whether the DMA write or read request is in a page in a system image association list associated with system image pages of system image 1116.

The third mechanism that LPAR manager 708 can use to associate and make available host memory to a system image and to one or more virtual adapters is to write into the virtual adapter's resources a system image buffer association list 1154. In FIG. 11, virtual adapter resources 1150 contains a list of PCI bus address pairs (starting and ending address), where each pair of PCI bus addresses in the list is associated by the platform hardware to a pair (starting and ending) of addresses of a system image buffer, such as SI 2 buffer 1 1166 through SI 1 buffer N 1180 allocated to system image 1116. At initial configuration, and during reconfigurations, LPAR manager 708 loads system image buffer association list 1154 into the virtual adapter resources 1150. The system image buffer association list 1154 defines the set of addresses that virtual adapter 1112 can use in DMA write and read operations. After the system image buffer association list 1154 has been created, virtual adapter 1112 validates whether each DMA write or DMA read requested by system image 1116 is contained within a buffer in system image buffer association list 1154. If the DMA write or DMA read requested by system image 1116 is contained within a buffer in the system image buffer association list 1154, then virtual adapter 1112 may perform the operation. Otherwise, virtual adapter 1112 is prohibited from performing the operation. Alternatively, the PCI family adapter 1101 may use a special, LPAR manager-style virtual adapter (rather than virtual adapter 1112) to perform the check that determines if DMA write or DMA read operations requested by system image 1116 is contained within a buffer in the system image buffer association list 1154. In a similar manner, virtual adapter 1104 associated with system image 1108 may validate DMA write or read requests submitted by system image 1108. Particularly, virtual adapter 1104 provides validation for DMA read and write requests from system image 1108 by determining whether the DMA write or read requested by system image 1108 is contained within a buffer in a buffer association list that contains PCI bus starting and ending address pairs in association with system image buffer starting and ending address pairs of buffers allocated to system image 1108 in a manner similar to that described above for system image 1116 and virtual adapter 1112.

The fourth mechanism that LPAR manager 708 can use to associate and make available host memory to a system image and to one or more virtual adapters is to write into the virtual adapter's resources a single starting and ending address in system image buffer association list 1154. In FIG. 11, virtual adapter resources 1150 contains a single pair of PCI bus starting and ending address that is associated by the platform hardware to a pair (starting and ending) of addresses associated with a system image buffer, such as SI 2 buffer 1 1166. At initial configuration, and during reconfigurations, LPAR manager 708 loads the starting and ending addresses of SI 2 buffer 1166 into the system image buffer association list 1154 in virtual adapter resources 1150. The system image buffer association list 1154 then defines the set of addresses that virtual adapter 1112 can use in DMA write and read operations. After the system image buffer association list 1154 has been created, virtual adapter 1112 validates whether each DMA write or DMA read requested by system image 1116 is contained within the system image buffer association list 1154. If the DMA write or DMA read requested by system image 1116 is contained within system image buffer association list 1154, then virtual adapter 1112 may perform the operation. Otherwise, virtual adapter 1112 is prohibited from performing the operation. Alternatively, the PCI family adapter 1101 may use a special, LPAR manager-style virtual adapter (rather than virtual adapter 1150) to perform the check that determines if DMA write or DMA read requested by system image 1116 is contained within a page system image buffer association list 1154. In a similar manner, virtual adapter 1104 associated with system image 1108 may validate DMA write or read requests submitted by system image 1108. Particularly, virtual adapter 1104 provides validation for DMA read and write requests from system image 1108 by determining whether the DMA write or read requested by system image 1108 is contained within a buffer in a buffer association list that contains a single PCI bus starting and ending address in association with a system image buffer starting and ending address allocated to system image 1108 in a manner similar to that described above for system image 1116 and virtual adapter 1112.

Figure 12:
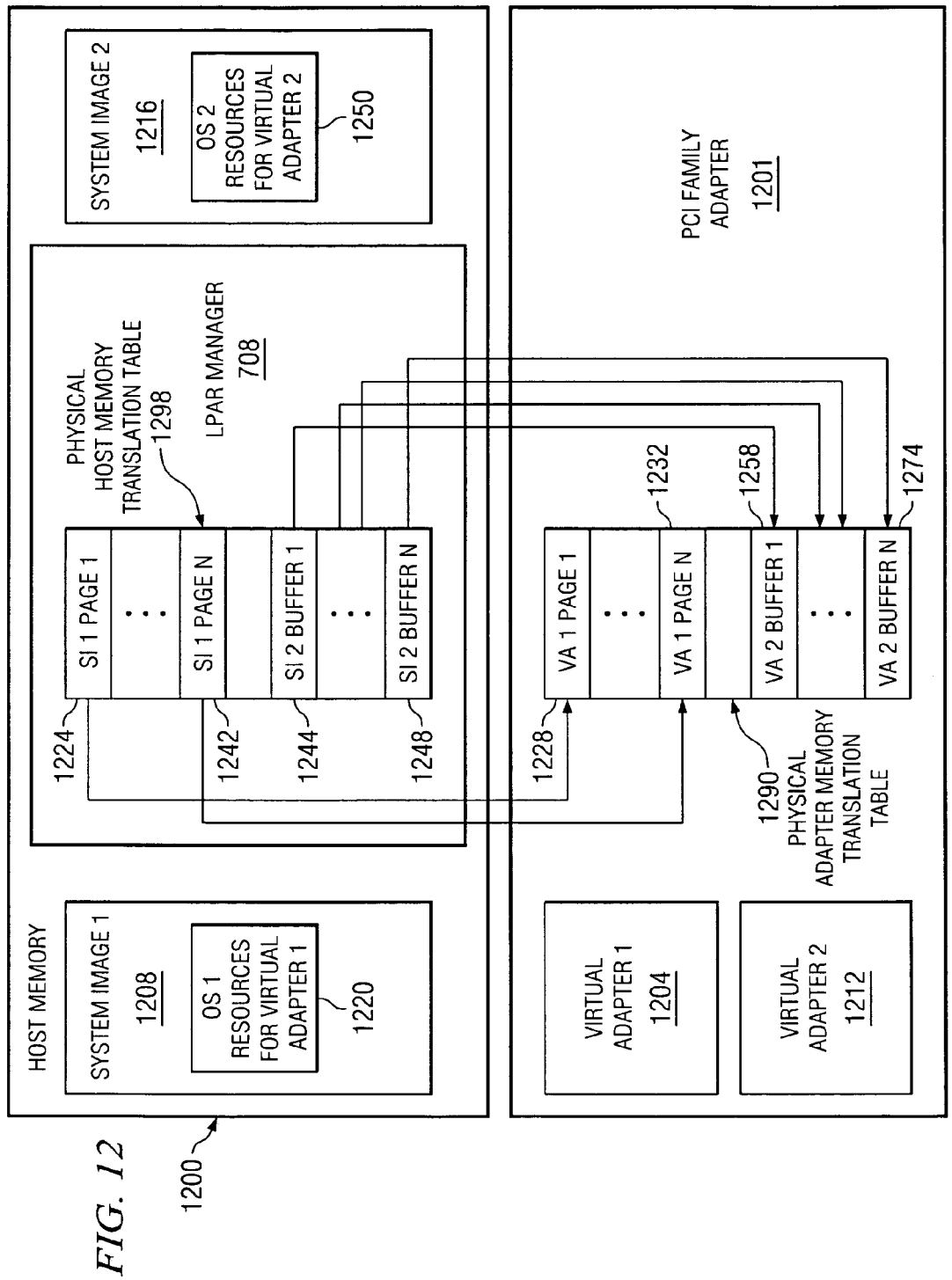
FIG. 12 is a diagram illustrating how a PCI family adapter allows a logical partitioning manager to associate memory in the PCI adapter to a system image and its associated virtual adapter in accordance with a preferred embodiment of the present invention.

Turning next to FIG. 12, a functional block diagram of a PCI family adapter configured with memory addresses that are made accessible to a system image is depicted in accordance with a preferred embodiment of the present invention.

FIG. 12 depicts four different mechanisms by which a LPAR manager can associate PCI family adapter memory to a virtual adapter, such as virtual adapter 1204, and to a system image, such as system image 1208. Once PCI family adapter memory has been associated to a system image and a virtual adapter, the system image can then perform Memory Mapped I/O write and read (i.e., store and load) operations directly to the PCI family adapter memory.

A notable difference between the system image and virtual adapter configuration shown in FIG. 11 and FIG. 12 exists. In the configuration shown in FIG. 11, PCI family adapter 1101 only holds a list of host addresses that do not have any local memory associated with them. If the PCI family adapter supports flow-through traffic, then data arriving on an external port can directly flow through the PCI family adapter and be transferred, through DMA writes, directly into these host addresses. Similarly, if the PCI family adapter supports flow-through traffic, then data from these host addresses can directly flow through the PCI family adapter and be transferred out of an external port. Accordingly, PCI family adapter 1101 shown in FIG. 11 does not include local adapter memory and thus is unable to initiate a DMA operation. On the other hand, PCI family adapter 1201 shown in FIG. 12 has local adapter memory that is associated with the list of host memory addresses. PCI family adapter 1201 can initiate, for example, DMA writes from its local memory to the host memory or DMA reads from the host memory to its local memory. Similarly, the host can initiate, for example, Memory Mapped I/O writes from its local memory to the PCI family adapter memory or Memory Mapped I/O reads from the PCI family adapter memory to the host's local memory.

The first and second mechanisms that LPAR manager 708 can use to associate and make available PCI family adapter memory to a system image and to a virtual adapter is to write into the PCI family adapter's physical adapter memory translation table 1290 a page size and the starting address of one (first mechanism) or more (second mechanism) pages. In this case all pages have the same size. For example, FIG. 12 depicts a set of pages that have been mapped between the system image 1208 and virtual adapter 1204. Particularly, SI 1 page 1 1224 through SI 1 page N 1242 of system image 1208 are mapped (illustratively shown by interconnected arrows) to virtual adapter memory pages 1224-1232 of physical adapter 1201 local memory. For system image 1208, all pages 1224-1242 in the list have the same size. At initial configuration, and during reconfigurations, LPAR manager 708 loads the PCI family adapter's physical adapter memory translation table 1290 with the page size and the starting address of one or more pages. The physical adapter memory translation table 1290 then defines the set of addresses that virtual adapter 1204 can use in DMA write and read operations. After physical adapter memory translation table 1290 has been created, PCI family adapter 1201 (or virtual adapter 1204) validates that each DMA write or DMA read requested by system image 1208 is contained in the physical adapter memory translation table 1290 and is associated with virtual adapter 1204. If the DMA write or DMA read requested by system image 1208 is contained in the physical adapter memory translation table 1290 and is associated with virtual adapter 1204, then virtual adapter 1204 may perform the operation. Otherwise, virtual adapter 1204 is prohibited from performing the operation. The physical adapter memory translation table 1290 also defines the set of addresses that system image 1208 can use in Memory Mapped I/O (MMIO) write and read operations. After physical adapter memory translation table 1290 has been created, PCI family adapter 1201 (or virtual adapter 1204) validates whether the Memory Mapped I/O write or read requested by system image 1208 is contained in the physical adapter memory translation table 1290 and is associated with virtual adapter 1204. If the MMIO write or MMIO read requested by system image 1208 is contained in the physical adapter memory translation table 1290 associated with virtual adapter 1204, then virtual adapter 1204 may perform the operation. Otherwise virtual adapter 1204 is prohibited from performing the operation. It should be understood that other system images and associated virtual adapters, e.g., system image 1216 and virtual adapter 1212, are configured in a similar manner for PCI family adapter 1201 (or virtual adapter 1212) validation of DMA operations and MMIO operations requested by system image 1216.

The third and fourth mechanisms that LPAR manager 708 can use to associate and make available PCI family adapter memory to a system image and to a virtual adapter is to write into the PCI family adapter's physical adapter memory translation table 1290 one (third mechanism) or more (fourth mechanism) buffer starting and ending addresses (or starting address and length). In this case, the buffers may have different sizes. For example, FIG. 12 depicts a set of varying sized buffers that have been mapped between system image 1216 and virtual adapter 1212. Particularly, SI 2 buffer 1 1244 through SI 2 buffer N 1248 of system image 1216 are mapped to virtual adapter buffers 1258-1274 of virtual adapter 1212. For system image 1216, the buffers in the list have different sizes. At initial configuration, and during reconfigurations, LPAR manager 708 loads the PCI family adapter's physical adapter memory translation table 1290 with the starting and ending address (or starting address and length) of one or more pages. The physical adapter memory translation table 1290 then defines the set of addresses that virtual adapter 1212 can use in DMA write and read operations. After physical adapter memory translation table 1290 has been created, PCI family adapter 1201 (or virtual adapter 1212) validates that each DMA write or DMA read requested by system image 1216 is contained in the physical adapter memory translation table 1290 and is associated with virtual adapter 1212. If the DMA write or DMA read requested by system image 1216 is contained in the physical adapter memory translation table 1290 and is associated with virtual adapter 1212, then virtual adapter 1212 may perform the operation. Otherwise, virtual adapter 1212 is prohibited from performing the operation. The physical adapter memory translation table 1290 also defines the set of addresses that system image 1216 can use in Memory Mapped I/O (MMIO) write and read operations.

After physical adapter memory translation table 1290 has been created, PCI family adapter 1201 (or virtual adapter 1212) validates whether a MMIO write or read requested by system image 1216 is contained in the physical adapter memory translation table 1290 and is associated with virtual adapter 1212. If the MMIO write or MMIO read requested by system image 1216 is contained in the physical adapter memory translation table 1290 and is associated with virtual adapter 1212, then virtual adapter 1212 may perform the operation. Otherwise virtual adapter 1212 is prohibited from performing the operation. It should be understood that other system images and associated virtual adapters, e.g., system image 1208 and associated virtual adapter 1204, are configured in a similar manner for PCI family adapter 1201 (or virtual adapter 1204) validation of DMA operations and MMIO operations requested by system image 1216.

Figure 13:
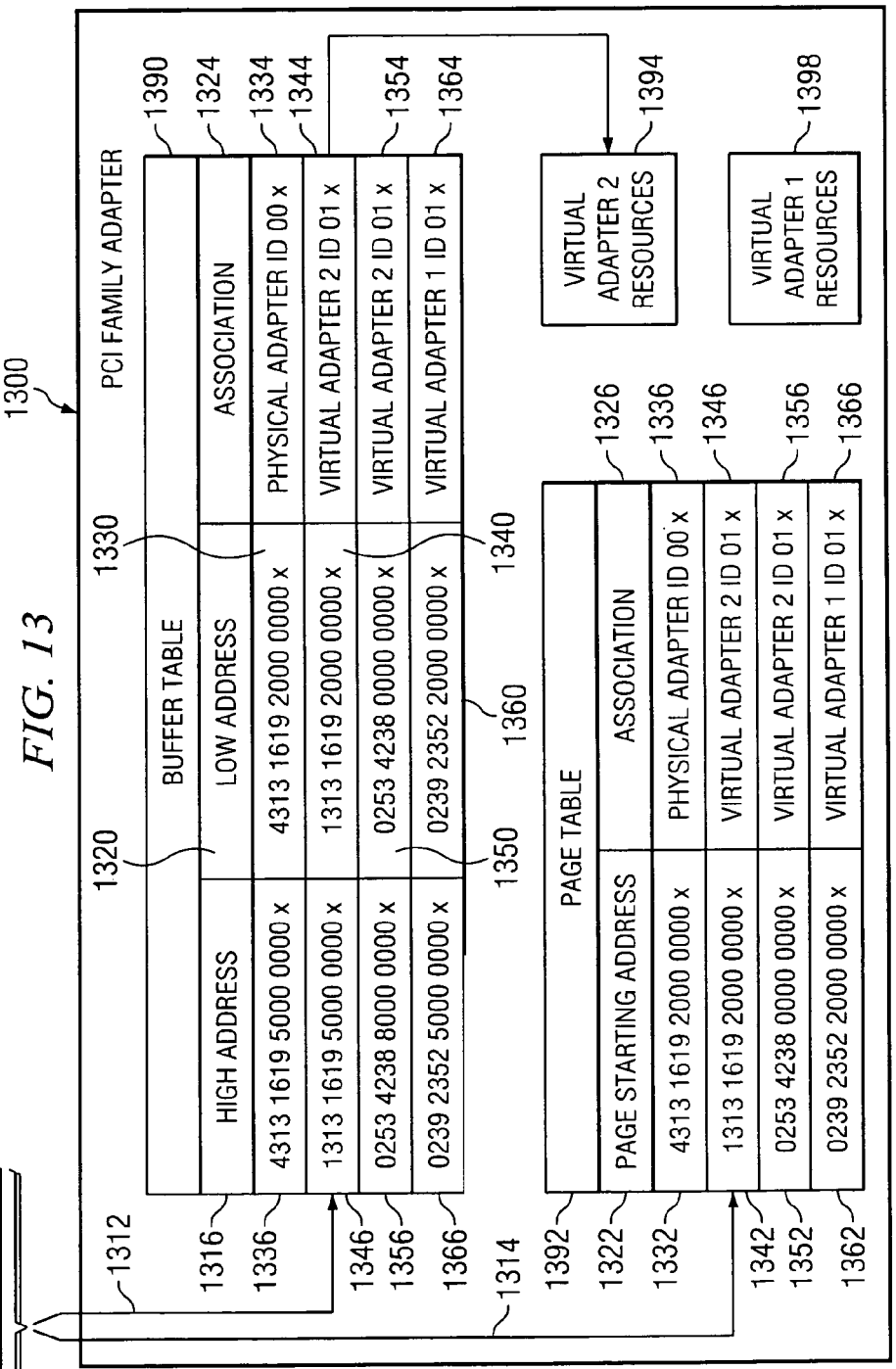
FIG. 13 is a diagram illustrating one of the options for determining the virtual adapter that is associated with an incoming memory address in accordance with a preferred embodiment of the present invention.

With reference next to FIG. 13, a functional block diagram of a PCI family adapter and a physical address memory translation table, such as a buffer table or a page table, is depicted in accordance with a preferred embodiment of the present invention.

FIG. 13 also depicts four mechanisms for how an address referenced in an incoming PCI bus transaction 1304 can be used to look up the virtual adapter resources (including the local PCI family adapter memory address that has been mapped to the host address), such as virtual adapter resources 1398 or virtual adapter 1394 resources, associated with the memory address.

The first mechanism is to compare the memory address of incoming PCI bus transaction 1304 with each row of high address 1316 and low address 1320 in buffer table 1390. If incoming PCI bus transaction 1304 has an address that is lower than the contents of high address 1316 cell and that is higher than the contents of low address 1320 cell, then incoming PCI bus transaction 1304 is within the high address and low address cells that are associated with the corresponding virtual adapter. In such a scenario, the incoming PCI bus transaction 1304 is allowed to be performed on the matching virtual adapter. Alternatively, if incoming PCI bus transaction 1304 has an address that is not between the contents of high address 1316 cell and the contents of low address 1320 cell, then completion or processing of incoming PCI bus transaction 1304 is prohibited. The second mechanism is to simply allow a single entry in buffer table 1390 per virtual adapter.

The third mechanism is to compare the memory address of incoming PCI bus transaction 1304 with each row of page starting address 1322 and with each row of page starting Address 1322 plus the page size in the page table 1392. If incoming PCI bus transaction 1304 has an address that is higher than or equal to the contents of page starting address 1322 cell and lower than page starting address 1322 cell plus the page size, then incoming PCI bus transaction 1304 is within a page that is associated with a virtual adapter. Accordingly, incoming PCI bus transaction 1304 is allowed to be performed on the matching virtual adapter. Alternatively, if incoming PCI bus transaction 1304 has an address that is not within the contents of page starting address 1322 cell and page starting address 1322 cell plus the page size, then completion of incoming PCI bus transaction 1304 is prohibited. The fourth mechanism is to simply allow a single entry in page table 1392 per virtual adapter.

Figure 14:
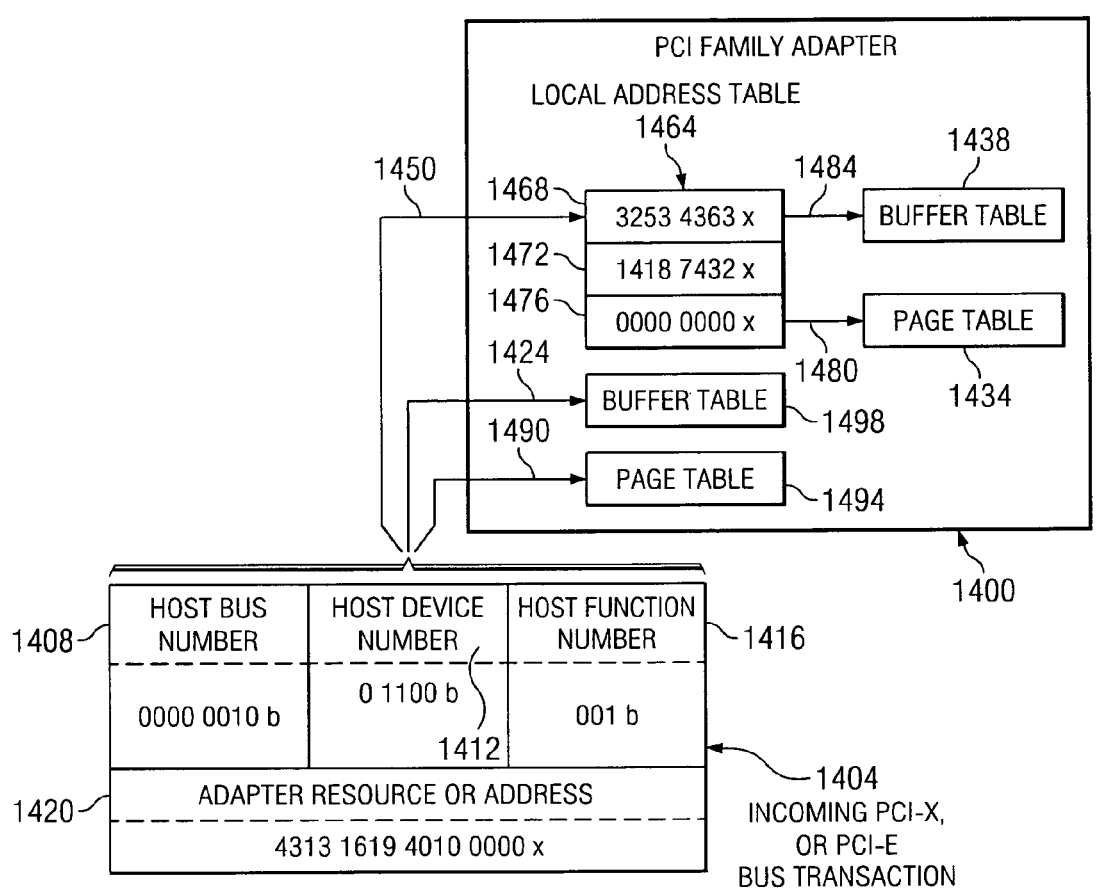
FIG. 14 is a diagram illustrating one of the options for determining a virtual adapter that is associated with a PCI-X or PCI-E bus transaction in accordance with a preferred embodiment of the present invention.

With reference next to FIG. 14, a functional block diagram of a PCI family adapter and a physical address memory translation table, such as a buffer table, a page table, or an indirect local address table, is depicted in accordance with a preferred embodiment of the present invention.

FIG. 14 also depicts several mechanisms for how a requester bus number, such as host bus number 1408, a requestor device number, such as host device number 1412, and a requester function number, such as host function number 1416, referenced in incoming PCI bus transaction 1404 can be used to index into either buffer table 1498, page table 1494, or indirect local address table 1464. Buffer table 1498 is representative of buffer table 1390 shown in FIG. 13. Page table 1490 is representative of page table 1392 shown in FIG. 13. Local address table 1464 contains a local PCI family adapter memory address that references either a buffer table, such as buffer table 1438, or a page table, such as page table 1434, that only contains host memory addresses that are mapped to the same virtual adapter.

The requester bus number, such as host bus number 1408, requestor device number, such as host device number 1412, and requestor function number, such as host function number 1416, referenced in incoming PCI bus transaction 1404 provides an additional check beyond the memory address mappings that were set up by a host LPAR manager.

Figure 15:
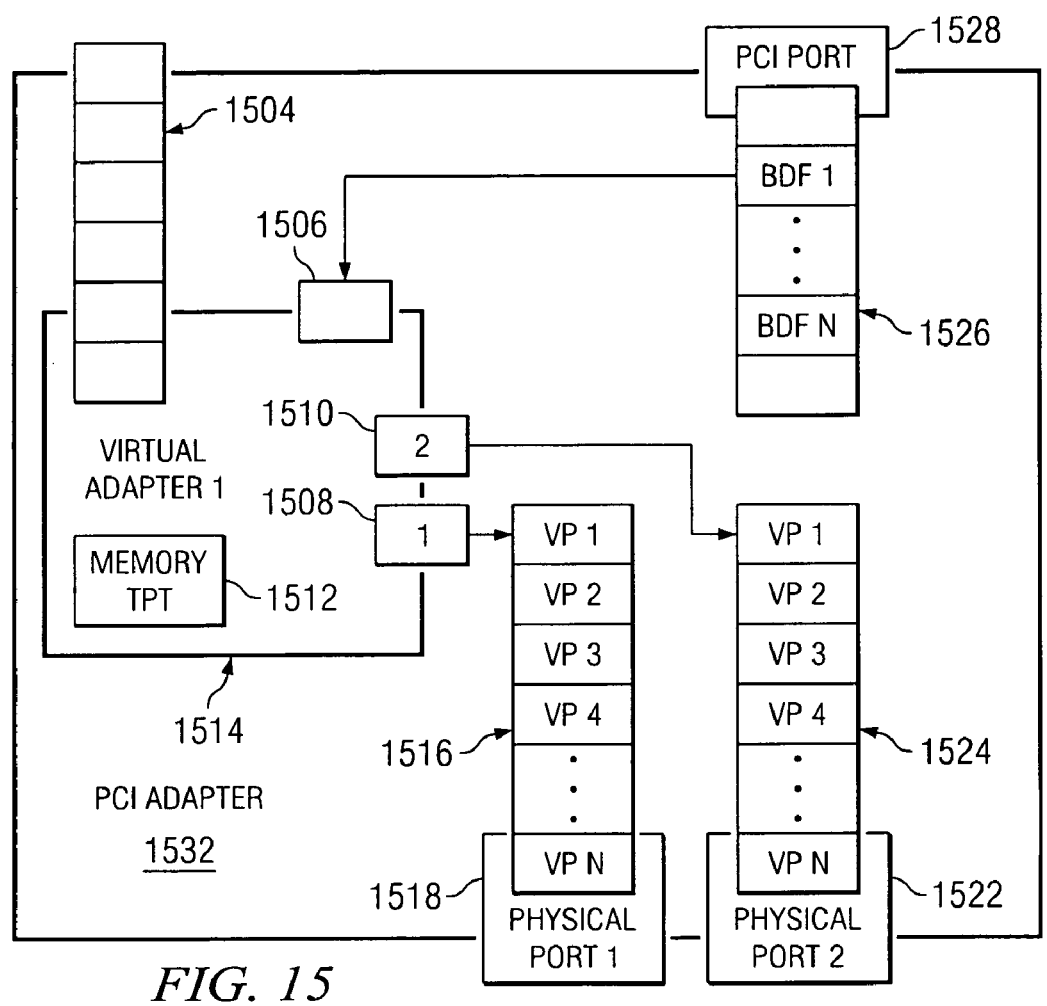
FIG. 15 is a diagram illustrating a virtual adapter management approach for virtualizing adapter resources in accordance with a preferred embodiment of the present invention.

Turning next to FIG. 15, a virtual adapter level management approach is depicted in accordance with a preferred embodiment of the present invention. Under this approach, a physical or virtual host creates one or more virtual adapters, such as virtual adapter 1514, that each contains a set of resources within the scope of the physical adapter, such as PCI adapter 1532. Each virtual adapter is associated with a host side system image. A virtual adapter comprises a collection of resources (either virtualized or partitioned) of the physical adapter. By defining a virtual adapter entity, all virtual resources associated with a system image can be collectively manipulated by directing an action to the corresponding virtual adapter. For example, a virtual adapter (and all included virtual resources) can be created, destroyed, or modified by performing a function targeting the corresponding virtual adapter. Additionally, the virtual adapter management approach allows all resources of a virtual adapter to be identified with a single identifier, e.g., a bus, device, and function number, that is associated with the virtual adapter. The set of resources associated with virtual adapter 1514 may include, for example: processing queues and associated resources 1504, adapter PCI port 1528 for one or more of adapter PCI port 1528 included on PCI physical adapter 1532, a PCI virtual port 1506 that is associated with one of the possible addresses on the adapter PCI port 1528, one or more downstream physical ports 1518 and 1522 for each downstream physical port, a downstream virtual port 1508 and 1510 that is associated with one of the possible addresses on physical port 1518 and 1522, and one or more address translation and protection tables (ATPTs) 1512. A virtual port, as referred to herein, comprises a software entity that facilitates receiving and sending of data from and to one or more resources of an input/output adapter. A virtual port is associated with, or mapped to, a port that is deployed on the input/output adapter. For example, a virtual port may be associated with an adapter PCI port with which the input/output adapter interfaces with a host or a physical port on the adapter that interfaces with a peripheral or network. A virtual port has an associated identifier, such as an address, index, or another suitable identifier for referencing the virtual adapter. A single port, such as a PCI port or a physical port on an input/output adapter, may have multiple virtual ports associated therewith. Additionally, a virtual port is preferably configured to exhibit one or more characteristics of a physical port to which it is mapped.

When an entity, such as a system image or application, uses a virtual adapter to perform an input/output operation, the virtual adapter may subsequently be destroyed to prevent residual data from migrating between system partitions, e.g., from one system image to another system image. For example, assume a first system image accesses a virtual adapter during an input/output transaction and that after completion of the transaction, the system image then terminates at which time the virtual adapter is destroyed. Destruction of the virtual adapter comprises deallocating the resources of the virtual adapter. The deallocated resources may then be later allocated to a subsequently initialized virtual adapter. Pursuant to preventing migration of data between system partitions, any data maintained by virtual adapter resources is purged therefrom during a virtual adapter destroy operation. Advantageously, system image data isolation is facilitated during creation of a virtual adapter that utilizes virtual adapter resources previously allocated to another virtual adapter that was later destroyed.

Figure 16:
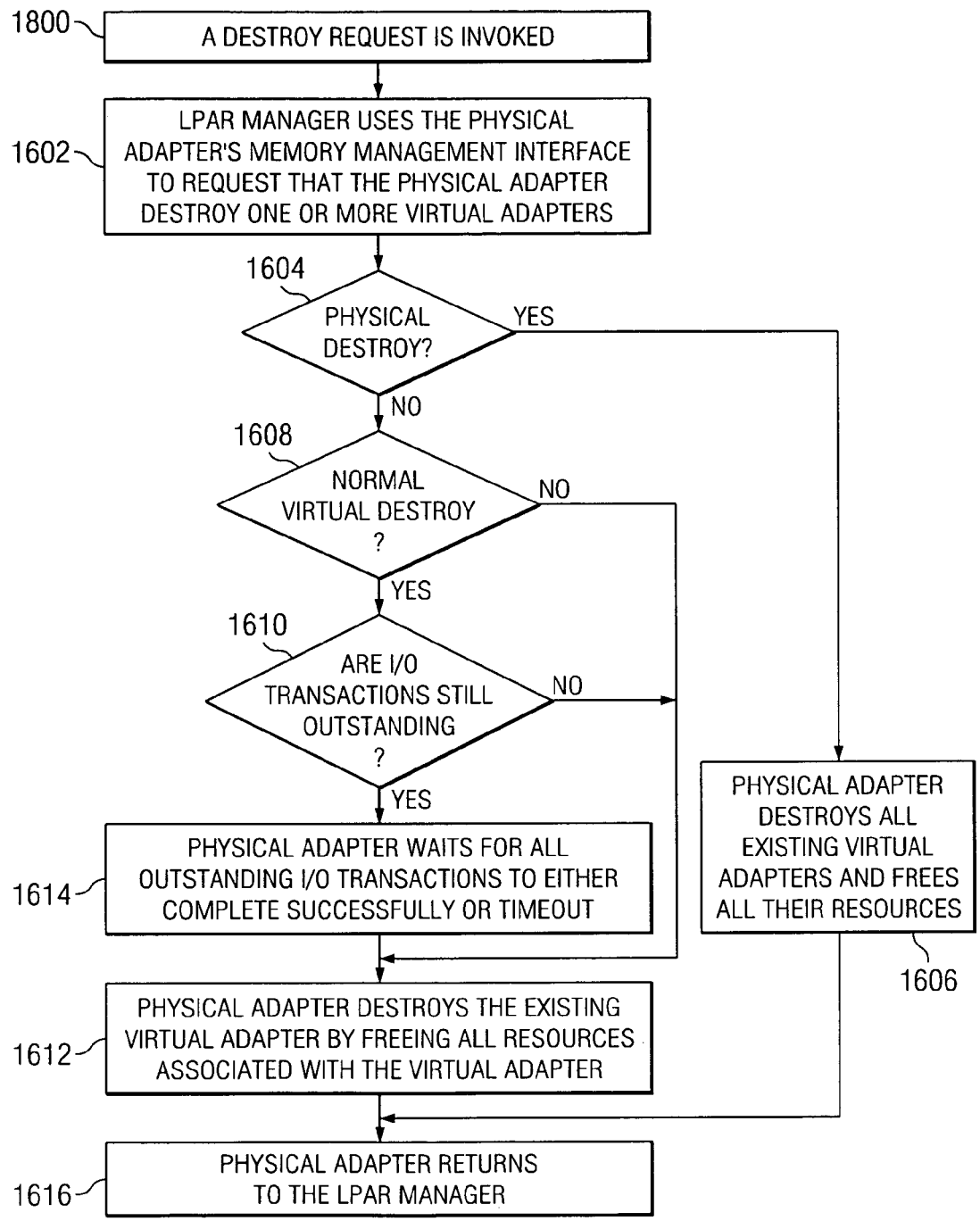
FIG. 16 is a flowchart outlining an exemplary operation of the destruction of an existing virtual adapter through the virtual adapter management approach described in FIG. 15 in accordance with a preferred embodiment of the present invention.

With reference next to FIG. 16, a flowchart of an exemplary virtual adapter destroy operation of one or more virtual adapters allocated on a Physical Adapter is shown in accordance with a preferred embodiment of the present invention. The exemplary virtual adapter destroy operation described is performed on a physical adapter that uses the virtual adapter management techniques described above in FIG. 15.

Through either a user management interface or an automated script/workflow, a request to destroy one or all Virtual Adapters is invoked (step 1600). The virtual adapter(s) referenced in the destroy request may be defined by any one of various attributes or identifiers. Table A summarizes exemplary attributes that may be employed for referencing one or more virtual adapters in a destroy request.

TABLE A

| Attribute | Type | Description |
| --- | --- | --- |
| Downstream Virtual ID | Optional | The downstream network ID(s) associated with the Virtual Adapter(s) being reset: For Fibre Channel, N-port ID; For Ethernet, MAC Address; For Ethernet VLAN, VLAN ID; For IP, IP Address; For SCSI host; Initiator ID; For SCSI target; Target ID. |
| Bus/Dev/Func Number for Virtual Adapter | Optional | Only used for PCI-X and PCI-E adapters. The PCI Bus Number, Device Number, and Function Number(s) (Bus/Dev/Func #) associated with the Virtual Adapter(s) being reset. |
| MSI Level for the Virtual Adapter | Optional | For an adapter capable of supporting message signaled interrupts (MSI), the message signaled interrupt level(s) associated with the Virtual Adapter(s) being reset. |
| Virtual Adapter ID | Optional | The Virtual Adapter ID(s) associated with the Virtual Adapter(s) being reset, |

The LPAR manager uses the physical adapter's memory management interface (i.e. the memory mapped I/O addresses that are used for virtual adapter configuration management) to request that the physical adapter destroy one or more virtual adapters (step 1602). The request may be conveyed directly from the LPAR manager or, alternatively, may be issued by an intermediary, such as a system image, acting on behalf of the LPAR manager. One or more of the attributes, or a suitable substitute, described in Table A may be included in the request conveyed to the physical adapter for referencing the virtual adapter(s) to be destroyed.

The physical adapter checks to see if the request is for the destruction of all virtual adapters (step 1604). That is, the physical adapter checks to determine if the destroy request is a request for a physical destroy. If the request is a physical destroy request, the physical adapter destroys all virtual adapters (step 1606). For example, the physical adapter may reset all virtual adapters, and destroy them by freeing all the resources associated with the virtual adapters. The virtual adapter destroy operation then returns to the LPAR manager the results of the operation, namely: a virtual adapter destroy confirmation if the virtual adapters were destroyed successfully; or, alternatively, an error code if for some reason the virtual adapters could not be destroyed (step 1616).

Returning again to step 1604, in the event that the virtual adapter destroy request is not a physical destroy request, the virtual adapter destroy operation proceeds to determine whether the destroy request is a normal virtual adapter virtual destroy request (step 1608). A normal virtual adapter destroy is a destroy operation performed on a virtual adapter that allows operations pending on the virtual adapter to complete prior to destruction of the virtual adapter. An abnormal, or forced, virtual adapter destroy is a virtual adapter destroy operation that performs the virtual adapter destruction regardless of whether there is outstanding work or not being performed or pending on the virtual resource. An abnormal destroy request may, for example, be performed when a normal destroy request does not successfully execute because of an error condition. If the virtual adapter destroy request is not a normal destroy request, the virtual adapter destroy operation proceeds to destroy the existing virtual adapter (step 1612), for example by freeing all resources associated with the virtual adapter referenced in the virtual adapter destroy request immediately.

Returning again to step 1608, in the event that the virtual adapter destroy request is identified as a normal virtual adapter destroy request, the physical adapter evaluates whether any I/O transactions are outstanding for the virtual adapter referenced in the virtual adapter destroy request (step 1610). If no I/O transactions are identified for the virtual adapter referenced by the destroy request, the physical adapter proceeds to destroy the virtual adapter referenced in the destroy request in accordance with step 1612.

Returning again to step 1610, if any outstanding I/O transactions are identified for the virtual adapter, then the virtual adapter destroy operation proceeds to wait for the identified outstanding I/O transactions to successfully complete or timeout (step 1614). The virtual adapter destroy operation than proceeds to destroy the existing virtual adapter in accordance with step 1612. After the physical adapter destroys the virtual adapter and has freed the resources associated with the destroyed virtual adapter, the physical adapter returns the results of the operation to the LPAR manager according step 1616.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of destroying a virtual adapter in a logically partitioned data processing system that includes a plurality of different system images, each one of the plurality of system images independently executing its own operating system, the method comprising the computer implemented steps of:

creating a physical host memory translation table in a host memory, wherein the physical host memory translation table includes a plurality of sets of system image pages, and further wherein each one of the plurality of sets of system image pages is mapped to a corresponding one of a plurality of virtual adapters in a physical adapter;

creating a physical adapter memory translation table in the physical adapter, wherein the physical adapter memory translation table includes a plurality of sets of virtual adapter memory locations and an association of each one of the plurality of sets of virtual adapter memory locations with a corresponding one of the plurality of system images;

for each one of the plurality of virtual adapters:
assigning a unique identifier to the virtual adapter, wherein resources contained by the virtual adapter is identified in the physical adapter memory translation table using the unique identifier; and
collectively manipulating the resources contained by the virtual adapter using only the unique identifier that identifies the virtual adapter;

invoking, by a particular one of the plurality of system images, a request to destroy a particular one of the plurality of virtual adapters that is associated with the particular one of the plurality of system images, wherein the request includes a particular unique identifier that is assigned to the particular one of the plurality of virtual adapters;

conveying the request to the physical adapter; and responsive to receipt of the request by the physical adapter, destroying the particular one of the plurality of virtual adapters by freeing resources contained by the particular one of the plurality of virtual adapters on the physical adapter, wherein any data in the resources contained by the particular one of the plurality of virtual adapters is purged when said resources are freed.

2. The method of claim 1, wherein the step of invoking is performed by a user management interface that interfaces with a logical partitioning manager.

3. The method of claim 1, wherein the step of conveying includes:

requesting, by a logical partitioning manager interfacing with the physical adapter, the physical adapter to destroy the particular one of the plurality of virtual adapters through a memory management interface of the physical adapter.

4. The method of claim 1, wherein the physical adapter comprises a peripheral component interconnect family adapter.

5. The method of claim 1, wherein the resources include virtual adapter resources and virtual adapter memory for each one of the plurality of virtual adapters, and wherein the virtual adapter memory is allocated from a configuration memory of the physical adapter.

6. The method of claim 1, wherein the physical adapter is a PCI adapter and the unique identifier is a number identifying a PCI bus, a PCI device, and a PCI function.

* * * * *